United States Patent [19]
Abe et al.

[11] Patent Number: 5,614,155
[45] Date of Patent: Mar. 25, 1997

[54] HEATER UNIT AND CATALYTIC CONVERTER

[75] Inventors: Fumio Abe, Handa; Shigeharu Hashimoto, Okazaki; Tomoharu Kondo, Toki, all of Japan

[73] Assignee: NGK Insulators, Ltd., Japan

[21] Appl. No.: 412,279

[22] Filed: Mar. 28, 1995

[30] Foreign Application Priority Data

Jun. 16, 1994 [JP] Japan .................................. 6-134701

[51] Int. Cl.⁶ ..................................................... F01N 3/10
[52] U.S. Cl. ........................ 422/174; 422/171; 422/173; 422/177; 422/179; 422/199; 422/211; 422/221; 422/222; 60/300; 219/543; 219/553
[58] Field of Search ..................................... 422/170–171, 422/177, 173–174, 179, 180, 198–199, 211, 221, 222; 60/299, 300; 502/439, 527; 55/DIG. 30; 219/542, 543, 552, 553

[56] References Cited

U.S. PATENT DOCUMENTS

| | | | |
|---|---|---|---|
| 4,448,754 | 5/1984 | Isogai et al. | 422/179 |
| 4,581,206 | 4/1986 | Otani et al. | 422/171 |
| 5,063,029 | 11/1991 | Mizuno et al. | 422/175 |
| 5,104,627 | 4/1992 | Usui et al. | 422/171 |
| 5,177,961 | 1/1993 | Whittenberger | 60/300 |
| 5,202,548 | 4/1993 | Kondo et al. | 219/552 |
| 5,229,079 | 7/1993 | Harada et al. | 422/174 |

FOREIGN PATENT DOCUMENTS

| | | | |
|---|---|---|---|
| 0618353 | 10/1994 | European Pat. Off. | F01N 3/28 |
| WO92/02714 | 2/1992 | WIPO | F01N 3/20 |

OTHER PUBLICATIONS

SAE Technical Paper Series No. 940466 "A Structurally Durable EHC for the Exhaust Manifold", Mizuno et al.

*Primary Examiner*—Robert J. Warden
*Assistant Examiner*—Hien Tran
*Attorney, Agent, or Firm*—Parkhurst, Wendel & Burr, L.L.P.

[57] ABSTRACT

A heater unit including a honeycomb heater, a metallic casing for holding the honeycomb heater, and a gas flow-controlling means for controlling flow of exhaust gas through the heater unit, such that about 2 to 20% of the total amount of exhaust gas flows outside the honeycomb heater, between the honeycomb heater and the metallic casing. The honeycomb heater may be attached inside the metallic casing via several appropriate devices including supporting, buffer and connecting devices.

22 Claims, 29 Drawing Sheets

GAS INLET

GAS FLOW ↓

C-C

D-D

CAULKING

HEATER UNIT AND CATALYTIC CONVERTER

BACKGROUND OF THE INVENTION (1) Field of the Invention

The present invention relates to heater units and catalytic converters which can be suitably used for purification of automotive exhaust gases, etc.

(2) Prior Art

In addition to hitherto known porous ceramic honeycomb structures, metallic honeycomb structures have recently drawn attention as a catalyst, a catalyst carrier or the like for conversion of the nitrogen oxides ($NO_x$), carbon monoxide (CO) and hydrocarbons (HC) contained in the exhaust gases discharged from the internal combustion engines of automobiles, etc.

Meanwhile, as the regulation for exhaust gases has become stricter, it is strongly desired to develop a heater or the like which can reduce emissions during the cold start of an engine.

U.S. Pat. No. 5,063,029 discloses a heater comprising a honeycomb structure with a resistance adjusting means (e.g. slits). U.S. Pat. No. 5,202,548 also discloses a method for holding a honeycomb heater in a casing by covering the periphery of the honeycomb heater with a metallic band via an insulating material (e.g. ceramic mat, ceramic cloth or the like).

In each of the above techniques, the resistance adjusting means is insulated and protected. Under severe driving conditions (vibration and thermal shock, in particular) of automobiles, however, the heater of U.S. Pat. No. 5,063,029 may develop detachment of the inorganic adhesive; and the heater of U.S. Pat. No. 5,202,548 may develop, owing to the vibration of horizontal and vertical directions, deformation of heater, breakage of spacer and wearing of insulating mat.

The present applicants made a further study and developed a heater unit which, when exposed to severe driving conditions of automobiles, etc. and subjected to vibration and the expansion and contraction caused by thermal shock, gives rise to neither breakage of the honeycomb heater nor peeling. (The heater unit was disclosed in SAE Technical Paper Series 940466.) This heater unit has substantially prevents deformation or breakage of honeycomb heater and is very preferable.

The heater unit has a structure comprising a honeycomb heater and a casing holding the honeycomb heater therein via a flexible metallic supporting member. In the SAE Technical Paper Series 940466, description is made also on a flexible electrode structure, a ring for gas flow restriction, and a light-off catalyst provided downstream of the honeycomb heater.

SUMMARY OF THE INVENTION

The present invention is a further improvement of the technique described in the above literature. The present inventors found out that the control of the amount of the exhaust gas flowing outside the honeycomb heater, at a given level is very important in order to achieve, in a good balance, the purification of exhaust gas and the prevention of the honeycomb heater from deformation. The finding has led to the completion of the present invention.

The present invention provides, as a first aspect, a heater unit comprising a honeycomb heater comprising (a) a metallic honeycomb structure having a large number of passages parallel to the direction of an exhaust gas flowing through the heater unit and (b) at least one electrode for electrification of the honeycomb structure, attached to the honeycomb structure. The heater unit has also a metallic casing for holding the honeycomb heater therein via at least one metallic supporting member. The heater unit further comprises an insulation portion provided at least either at the area where the honeycomb heater and the supporting member are connected or at the area where the supporting member and the casing are connected. The supporting member has such a structure as to be able to absorb the displacement of the honeycomb heater which appears in a direction substantially perpendicular to said gas flow direction, and has a function of fixing the honeycomb heater against its displacement which appears in the gas flow direction. The heater unit has a gas flow-controlling means provided at the inlet and/or side of the honeycomb heater so that the amount of the exhaust gas flowing outside the honeycomb heater is controlled at 20% or less of the total flow amount of exhaust gas.

The present invention also provides, as a second aspect, a heater unit comprising a honeycomb heater comprising a metallic honeycomb structure having a large number of passages parallel to the direction of an exhaust gas flowing through the heater unit and a metallic casing for holding the honeycomb heater therein. The heater unit has at least one electrode for electrification of the honeycomb structure. The electrode is connected with the honeycomb heater via a metallic connecting member and is fixed to the casing via an insulating member. The connecting member has such a structure as to be able to absorb the displacement of the honeycomb heater which appears in a direction substantially perpendicular to said gas flow direction. The heater unit further comprises a gas flow-controlling means provided at the inlet and/or side of the honeycomb heater so that the amount of the exhaust gas flowing outside the honeycomb heater is controlled at 20% or less of the total flow amount of exhaust gas.

The present invention also provides, as a third aspect, a heater unit comprising a honeycomb heater comprising a metallic honeycomb structure having a large number of passages parallel to the direction of an exhaust gas flowing through the heater unit and a metallic casing for holding the honeycomb heater therein. The heater unit has at least one electrode for electrification of the honeycomb structure. The electrode is connected directly with the honeycomb heater and is fixed to the casing via an insulating member and a buffer member connecting with the insulating member. The buffer member has such a structure as to be able to absorb the displacement of the honeycomb heater which appears in a direction substantially perpendicular to said gas flow direction. The heater unit further comprises a gas flow-controlling means provided at the inlet and/or side of the honeycomb heater so that the amount of the exhaust gas flowing outside the honeycomb heater is controlled at 20% or less of the total flow amount of exhaust gas.

The present invention further provides catalytic converters each comprising the heater unit of the first, second or third aspect, a light-off catalyst and a metallic casing holding the honeycomb heater and the light-off catalyst therein via supporting members, the light-off catalyst comprising a honeycomb heater structure having a large number of passages parallel to the direction of an exhaust gas flowing through the catalytic converter and being provided downstream of the honeycomb heater in the vicinity thereto.

BRIEF DESCRIPTION OF THE DRAWINGS

FIG. 10(A) is a plan view, and FIG. 10(B) is a side view.

FIG. 11(A) is a plan view, and FIG. 11(B) is a side view.

FIG. 13(A) is a plan view, and FIG. 13(B) is a side view.

FIG. 16(A) is a plan view; FIG. 16(B) is a sectional view taken at the A—A line of FIG. 16(A); and FIG. 16(C) is a side view containing a fragmentary section.

FIG. 17(A) is a plan view, and FIG. 17(B) is a side view.

FIG. 18(A) is a plan view, and FIG. 18(B) is a side view.

FIG. 19(A) is a plan view, and FIG. 19(B) is a side view.

FIG. 20(A) is a plan view, and FIG. 20(B) is a sectional view taken at the B—B line of FIG. 20(A).

FIG. 30(A) is a fragmentary plan view, and FIG. 30(B) is a sectional view taken at the C—C line of FIG. 30(A).

FIG. 31(A) is a fragmentary plan view, and FIG. 31(B) is a sectional view taken at the D—D line of FIG. 31(A).

FIG. 39(A) is a fragmentary sectional view when seen from the front, and FIG. 39(B) is a fragmentary sectional view when seen from the side.

FIG. 42(A) is a plan view, and FIG. 42(B) is a side view.

DETAILED DESCRIPTION OF THE INVENTION

The heater unit of the present invention is characterized in that a gas flow-controlling means is provided at the inlet and/or side of the honeycomb heater so that the amount of the exhaust gas flowing outside the honeycomb heater becomes 20% or less of the total flow amount of exhaust gas.

Thus in the present invention, the amount of the exhaust gas flowing outside the honeycomb heater is controlled at 20% or less of the total flow amount of exhaust gas by providing a gas flow-controlling means at the inlet and/or side of the honeycomb heater. When the amount of the exhaust gas flowing outside the honeycomb heater exceeds 20% of the total flow amount of exhaust gas, the purification ability of the honeycomb heater for exhaust gas during cold start of engine is reduced. When the amount of the exhaust gas flowing outside the honeycomb heater is 15% or less of the total flow amount of exhaust gas, a more preferable purification ability is achieved with low electric power.

When attention is paid to the purification ability, it is effective to completely seal the gap between the honeycomb heater and the casing holding the honeycomb heater, with a sealing material such as mat or the like to make zero the amount of the exhaust gas flowing outside the honeycomb heater. In this case, however, the carbonaceous substances present in the exhaust gas deposits on the mat, resulting in decrease in the insulation resistance between the casing and the honeycomb heater.

Preferably, the amount of the exhaust gas flowing outside the honeycomb heater is as small as possible in view of the purification ability. Meanwhile, when the exhaust gas makes no contact with the supporting member (e.g. ring), the temperature difference between the honeycomb heater and the supporting member becomes large and the honeycomb heater undergoes easy deformation at high temperatures. Hence, the amount of the exhaust gas flowing outside the honeycomb heater is preferably 2% or more of the total flow amount of exhaust gas.

In the present invention, the gas flow-controlling means is preferably formed by making the casing in such a shape that the distance between the inlet and/or side of the honeycomb heater and the portion of the casing closest to said honeycomb heater portion becomes 3 mm or less. Specific embodiments of such a gas flow-controlling means (i.e., a casing) include those shown in FIG. 1 and FIGS. 3 to 5.

Figure 3:
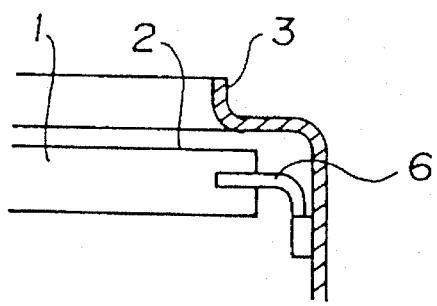
FIG. 3 is a view showing an example of the gas flow-controlling means used in the present invention.
Figure 4:
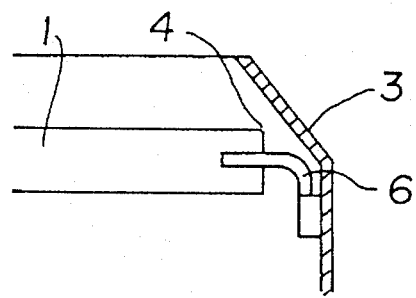
FIG. 4 is a view showing an example of the gas flow-controlling means used in the present invention.
Figure 5:
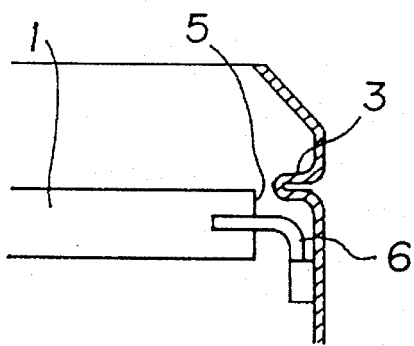
FIG. 5 is a view showing an example of the gas flow-controlling means used in the present invention.
Figure 6:
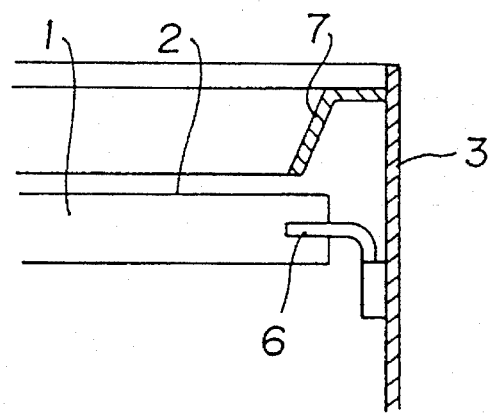
FIG. 6 is a view showing an example of the gas flow-controlling means used in the present invention.
Figure 7:
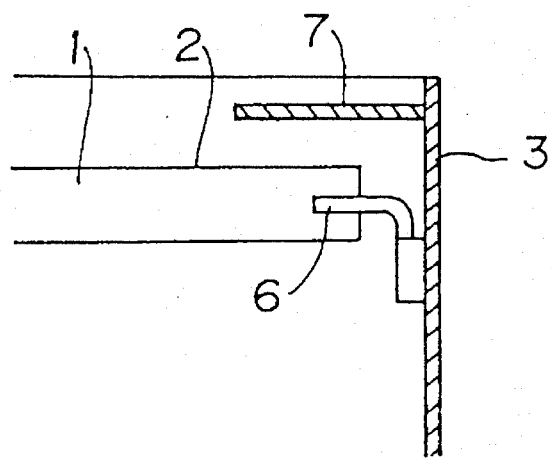
FIG. 7 is a view showing an example of the gas flow-controlling means used in the present invention.
Figure 8:
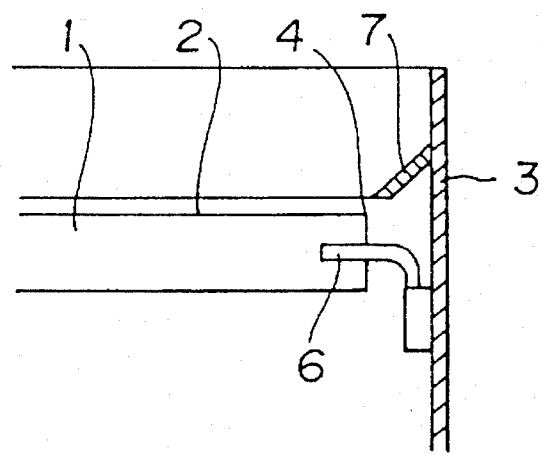
FIG. 8 is a view showing an example of the gas flow-controlling means used in the present invention.
Figure 9:
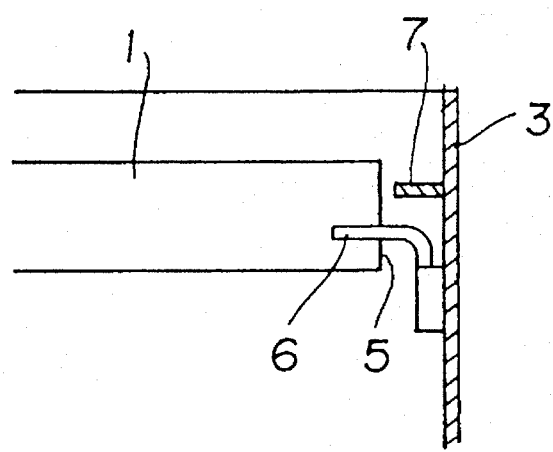
FIG. 9 is a view showing an example of the gas flow-controlling means used in the present invention.

The casing having such a shape can easily be formed by pressing or the like. The distance (FIG. 1) between the inlet end 2 of a honeycomb heater 1 and a casing 3, the distance (FIG. 4) between the inlet edge 4 of a honeycomb heater 1 and a casing 3, or the distance (FIG. 5) between the side 5 of a honeycomb heater 1 and a casing 3 is controlled at 3 mm or less, whereby the amount of the exhaust gas flowing outside the honeycomb heater 1 is controlled. In FIGS. 3 to 5, numeral 6 refers to a supporting member.

The amount of the exhaust gas flowing outside the honeycomb heater can be controlled not by making the casing in a given shape but by changing the shapes of the honeycomb heater and the supporting member.

The distance between the outer surface of the honeycomb heater and the portion of the casing closest thereto is preferably controlled at 3 mm or less. This distance is more preferably 2.2 mm or less in view of the purification ability of the honeycomb heater for exhaust gas. A distance of less than 0.5 mm is preferable in view of the purification ability for exhaust gas but is undesirable because the casing may contact with the honeycomb heater during welding or long-term-use, or owing to the thermal strain appearing at high temperatures.

In the present invention, the gas flow-controlling means may be formed by attaching it to the portion of the casing close to the inlet and/or side of the honeycomb heater so that the distance between the gas flow-controlling means and said honeycomb heater portion becomes 3 mm or less. Specific embodiments of such a gas flow-controlling means are shown in FIG. 2 and FIGS. 6 to 9. In these embodiments, a windshield ring 7 is fitted to the portion of a casing close to the inlet and/or side of a honeycomb heater 1 so that the shortest distance between the inlet end 2 or side 5 of the honeycomb heater 1 and the windshield ring 7 becomes 3 mm or less, whereby the amount of the exhaust gas flowing outside the honeycomb heater 1 is controlled.

Figure 1:
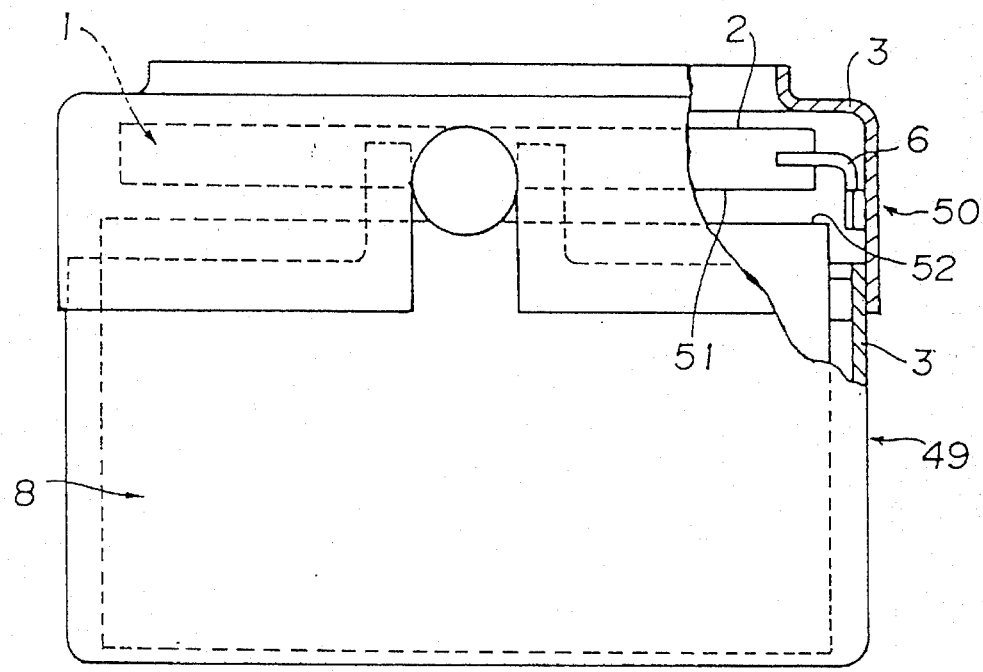
FIG. 1 is a side view of an example of the catalytic converter of the present invention, containing a fragmentary cutaway section.
Figure 2:
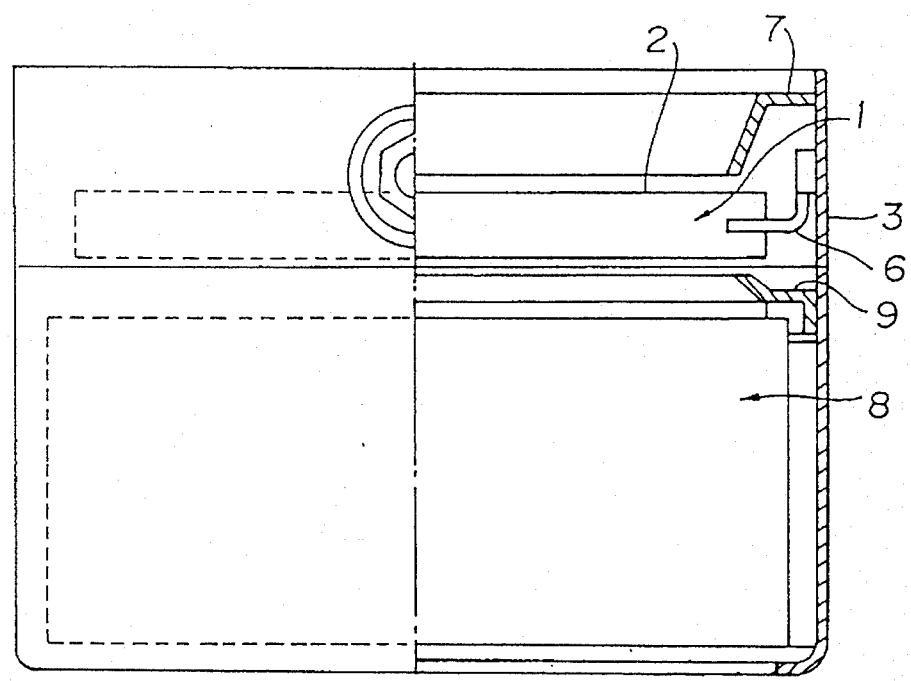
FIG. 2 is a side view of other example of the catalytic converter of the present invention, containing a fragmentary cutaway section.

In the present invention, as shown in FIGS. 1 and 2, downstream of a honeycomb heater 1 in the vicinity thereto is provided a light-off catalyst 8 comprising a honeycomb structure having a large number of passages parallel to the direction of the exhaust gas flowing through the honeycomb heater 1; they are held in a casing 3; thereby, a catalytic converter can be obtained.

In such a case of providing a light-off catalyst downstream of a honeycomb heater, it is preferable from the standpoint of purification ability to provide, as shown in FIG. 2, a ring-shaped gas flow-controlling means 9 also downstream of a honeycomb heater 1 and upstream of a light-off catalyst 8, i.e. between the honeycomb heater 1 and the light-off catalyst 8. This ring-shaped gas flow-controlling means 9 acts also as a supporting member for the light-off catalyst 8 and accordingly is preferable also from the standpoint of reduction in number of required parts.

The honeycomb heater 1 as shown in FIG. 1 or 2, ordinarily has a small size of about 5–20 mm in length and about 30–150 cc in volume (volume of honeycomb structure) and acts as an igniter for the downstream light-off catalyst 8. The distance between the honeycomb heater 1 and the downstream light-off catalyst 8 is preferably as small as possible for smaller heater loss, and is specifically 2–15 mm.

A preferable example of the catalytic converter of the present invention is shown in FIG. 1. In the catalytic converter of FIG. 1, no gas flow-controlling means is provided downstream of the honeycomb heater 1, but the distance between the honeycomb heater 1 and the light-off catalyst 8 is small. Therefore, the amount of the exhaust gas flowing outside the honeycomb heater 1 is reduced by the effect of the back pressure of the downstream light-off catalyst 8, and the purification efficiency is high owing to the above reason and the small distance between the honeycomb heater 1 and the light-off catalyst 8. The catalytic converter of FIG. 1 has further advantages that it has fewer welded sites as compared with the catalytic converter of FIG. 2 and allows for easy positioning of electrode.

The light-off catalyst 8 used in the catalytic converter of the present invention, ordinarily has a relatively small size of about 200–800 cc in volume, and is generally constituted by a honeycomb structure made of a ceramic or a metal. In such a light-off catalyst 8, a catalyst supported on the surface of the honeycomb structure is made of a carrier having a large surface area and a catalytically active material supported on the carrier. Typical examples of the carrier are a $\gamma$-$Al_2O_3$ type, a $TiO_2$ type, a $SiO_2$—$Al_2O_3$ type and a perovskite type. Examples of the catalytically active material are noble metals such as Pt, Pd, Rh and the like, and base metals such as Cu, Ni, Cr, Co and the like. A preferable catalyst is obtained by loading Pt or Pd on a $\gamma$-$Al_2O_3$ type catalyst in an amount of 10–100 g/ft$^3$.

Detailed description is made below on the constitutions of the heater units and catalytic converters of the present invention.

In the heater unit of the present invention, the honeycomb heater is held in the casing by the following three holding modes.

(1) The honeycomb heater is held in the casing via at least one metallic supporting member (the first holding mode).

(2) The honeycomb heater is held in the casing via at least one electrode and at least one metallic connecting member which connects the electrode and the honeycomb heater (the second holding mode).

(3) The honeycomb heater is connected directly with at least one electrode, and each electrode is fixed to the casing via a buffer member (the third holding mode).

In any of the three holding modes, an insulating member must be interposed between the honeycomb heater and the casing.

In the above holding modes, the supporting member has such a structure as to be able to absorb the displacement of the honeycomb heater which appears in a direction perpendicular to the direction of a gas flowing through the heater unit, and has a function of fixing the honeycomb heater against its displacement which appears in said gas flow direction. Meanwhile, the connecting member and the buffer member must each have such a structure as to be able to absorb the displacement of the honeycomb heater which appears in a direction perpendicular to said gas flow direction.

As a result, the heater unit of the present invention constituted as above can protect the honeycomb heater from the breakage and deformation which may be caused by vibration and the expansion and contraction due to thermal shock under the severe driving conditions of automobiles.

The metallic honeycomb structure used in the present invention has a large number of passages parallel to the direction of a gas flowing therethrough.

The honeycomb structure may be made of any material as long as it is a metal capable of generating heat when electrified. The honeycomb structure preferably has a Fe—Cr—Al type composition because the structure is exposed to high temperatures of automotive exhaust gases, etc. and must be heat-resistant and oxidation-resistant.

The cell shape of the honeycomb structure has no particular restriction, but a hexagon, a higher polygon, a corrugated shape, etc. are preferred to a tetragon and a triangle because the former shapes are more resistant to thermal shock and more flexible to expansion and contraction.

The cell number of the honeycomb structure has no particular restriction, either, but is preferably 100–600 cells/in.$^2$, more preferably 200–500 cells/in.$^2$ in view of the thermal conductivity of the structure, the purification efficiency of catalyst, etc. When the cell number is larger than 600 cells/in.$^2$, there arises the pressure loss of gas. (This description applies also to the honeycomb structure of the light-off catalyst.)

The honeycomb structure may be either a foil type obtained by corrugating a rolled thin plate (a foil) and winding the foil, or an extrusion type obtained by extrusion and powder metallurgy. The extrusion type is preferred in view of the structural durability.

The honeycomb structure must have a controlled resistance so as to be able to generate desired heat when electrified. The honeycomb structure of extrusion type, for example, has, as a resistance adjusting means, for example, slits as disclosed in Japanese Pat. Application Kokai (Laid-Open) No. 295184/1991. In this case, the honeycomb structure is provided with at least two electrodes for electrification, at the periphery, whereby a honeycomb heater is formed. (Herein, the electrode refers to any terminal for applying a voltage to the heater and includes terminals such as earth and the like.) When this honeycomb heater is used as a catalytic converter, a catalyst is generally coated on the honeycomb heater.

The honeycomb heater obtained as above is held in a casing. At that time, the following considerations must be made.

Since the metallic honeycomb structure has a thermal expansion coefficient as large as $10-20 \times 10^{-6}$/°C., the displacement which appears owing to the difference in thermal expansion between the honeycomb structure of high temperature and the casing of relatively low temperature, must be absorbed. Further, the honeycomb heater must be strongly fixed to the casing in order to maintain the breakage endurance and insulation ability of the honeycomb structure under the severe vibration when used in automobiles.

Hence, in the first aspect of the present invention, the honeycomb heater is held in and fixed to the metallic casing via at least one metallic supporting member.

The most important function of the supporting member is to absorb the displacement of the honeycomb heater which appears in a direction perpendicular to the direction of gas flow (said perpendicular direction is hereinafter referred to as radial direction) and further to fix the honeycomb heater against its displacement which appears in the gas flow direction.

The supporting member basically has the following constituent features. (The specific constitution of the supporting member is described later.)

(1) In order to absorb the displacement of the honeycomb heater which appears in its radial direction, the supporting member has a flexible structure (e.g. a spring structure) in the radial direction of the honeycomb heater.

(2) In order to fix the honeycomb heater against its displacement which appears in the direction of gas flow, the supporting member has a structure by which the honeycomb heater is fixed so as to have a large resistance and a large strength in the direction of gas flow.

Since the honeycomb heater and the casing must be insulated from each other, at least either of the connection area between the honeycomb heater and each supporting member and the connection area between each supporting member and the casing has an insulation portion made of an insulating member. Each of the two connection areas preferably has an insulating property in view of the safety standpoint but, generally, either of the areas is allowed to have an insulating property in view of the simplification of the honeycomb heater structure.

The position of the connection area between the honeycomb heater and each supporting member is not restricted and may be the periphery of the honeycomb heater, the vicinity of the periphery of the heater, the center of the heater, etc. However, the periphery of the honeycomb heater or the vicinity of the periphery of the heater is preferable in view of the heat resistance of the connection area and the hindrance of gas flow by the position of the connection area.

When the honeycomb heater is provided just below the manifold and is subjected to the most severe conditions, the displacement of the honeycomb heater appearing in the radial direction is, for example, a displacement of the heater appearing owing to the difference in thermal expansion between the heater of high temperature and the casing of relatively low temperature during the inflow of high temperature gas into the heater, and the displacement of the heater appearing in the direction of gas flow is a displacement of the heater appearing owing to the vibration of the engine.

Since the heater unit of the present invention possesses sufficient rigidity against vibrations not only parallel but also perpendicular to the direction of gas flow, the heater unit is not broken by sympathetic vibrations. Therefore, the heater unit of the present invention possesses sufficient durability against vibrations of any direction, and the position of the heater unit of the present invention is not limited to the manifold position, and any position in the exhaust gas pipe such as a position under the floor will do.

More detailed description is made referring to drawings.

First, description is made on the type A of the heater unit according to the first aspect of the present invention.

Figure 10A:
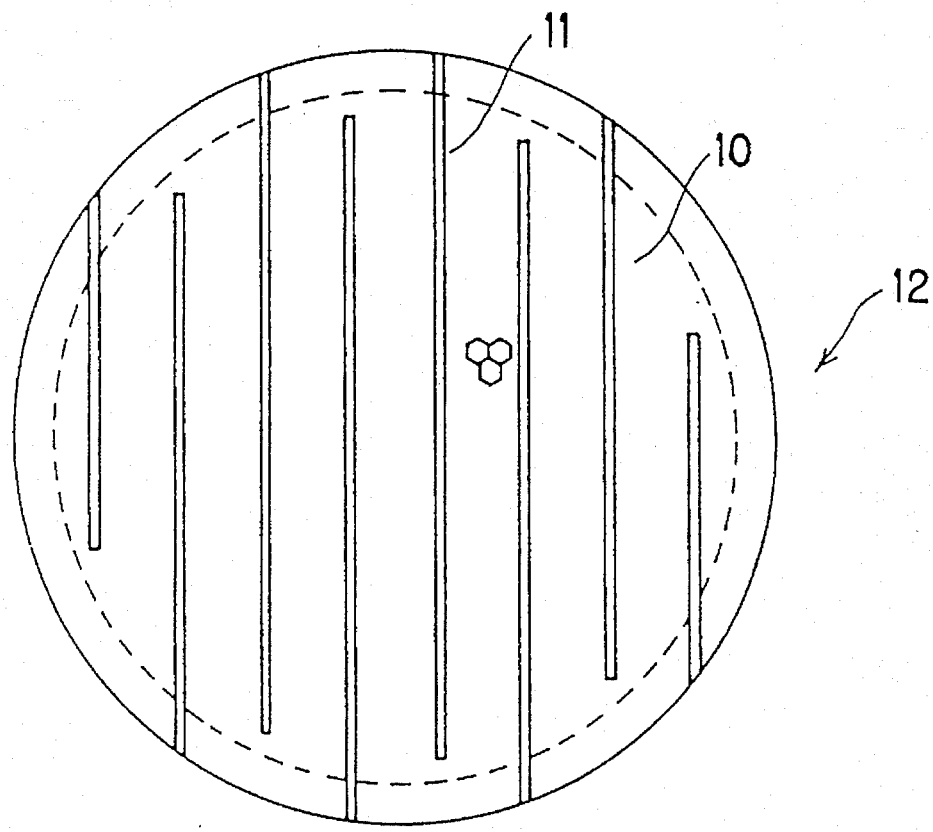
FIGS. 10(A) and 10(B) show an example of the honeycomb heater used in the present invention.
Figure 10B:
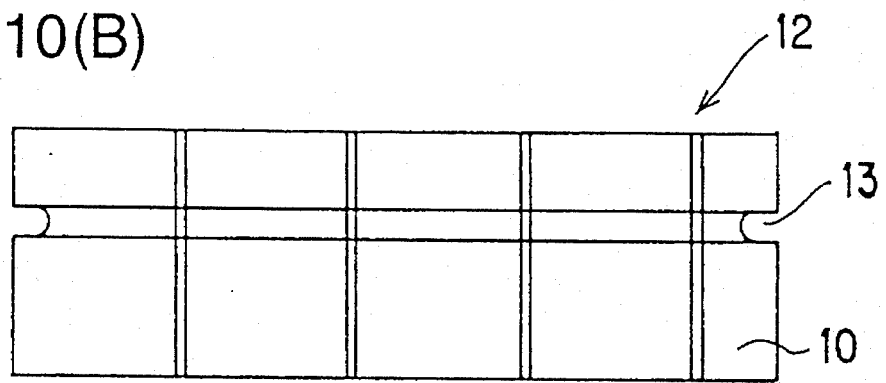

FIGS. 10(A) and 10(B) illustrate a honeycomb heater 12 obtained by forming slits 11 as a resistance adjusting means in a honeycomb structure 10 having hexagonal cells.

A groove 13 is formed on the periphery of the honeycomb heater 12. The groove 13 can be formed by applying cylindrical grinding to a sintered honeycomb structure 10 but, when the honeycomb structure 10 is produced by extrusion and powder metallurgy, the groove 13 may be formed by applying cylindrical grinding to a dried honeycomb structure 10.

Figure 11A:
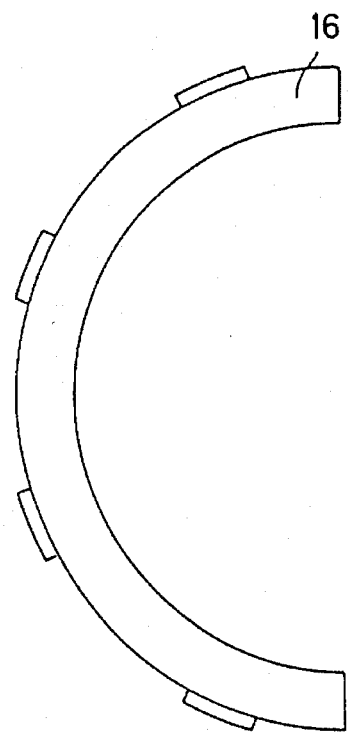
FIGS. 11(A) and 11(B) show an example of the supporting member used in the present invention.
Figure 11B:
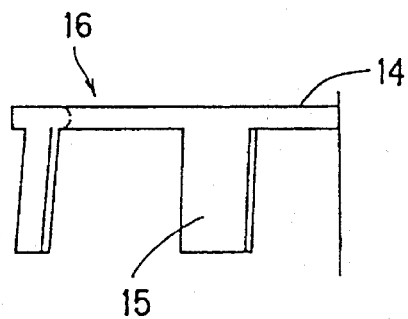

Two half-ring-shaped supporting members 16 as shown in FIGS. 11(A) and 11(B) are used as a supporting member. Each supporting member 16 has an arc portion 14 and leg portions 15.

Figure 12:
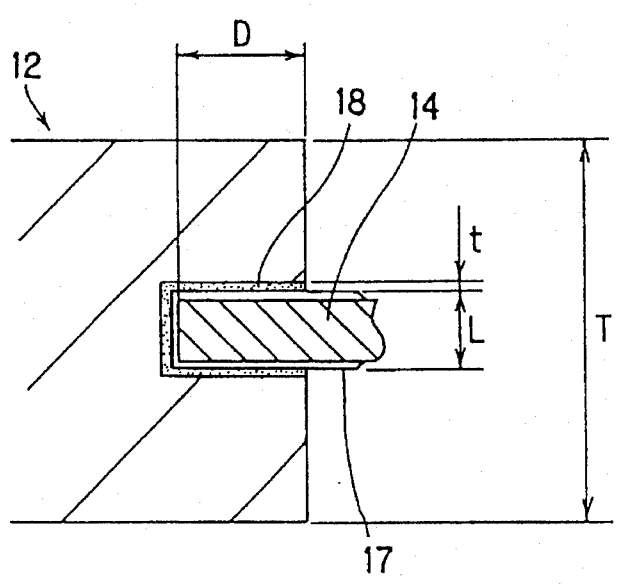
FIG. 12 is a fragmentary sectional view showing an example of the periphery of the honeycomb heater used in the present invention.

The arc portion 14 of each supporting member 16 is engaged in the groove 13 of the honeycomb heater 12, as shown in FIG. 12. The surface of each arc portion 14 is coated with an insulating coating 17 beforehand. The insulating coating 17 is formed by strongly adhering, to the arc surface, an heat-resistant inorganic material (e.g. glass including crystallized glass, ceramic or cement) by vitreous enamel process, flame spraying, ceramic coating, cement coating or the like.

The insulating coating 17 may also be applied to the surface of the groove 13 of the honeycomb heater 12 (this is not shown in FIG. 12). The thermal expansion coefficient of the insulating coating 17 preferably matches that of the supporting member 16.

In order to connect the supporting member 16 and the honeycomb heater 12, a cementing material 18 is used. The cementing material 18 can ordinarily be a heat-resistant inorganic cement made of $Al_2O_3$, $ZrO_2$, $SiO_2$—$Al_2O_3$ or the like. The cementing material 18 preferably has an insulating property by itself.

Thus, an insulation portion is formed by the insulating coating 17 and the cementing material 18, whereby the honeycomb heater 12 and the supporting member 16 are connected via the insulation portion.

When the cementing material 18 has an insulating property by itself, the insulating coating 17 is not necessarily required. The thickness of the insulating coating 17 is preferably 5–200 μm in view of the strength, insulating property and thermal shock resistance.

With respect to the shape of the insulation portion, the projected length L of the insulation portion in the direction of gas flow is preferably shorter than the thickness T of the honeycomb heater in the direction of gas flow.

Since the honeycomb heater 12 has a thermal expansion coefficient of ordinarily $10–20\times10^{-6}/°C$. and the insulation portion, for example, the cementing material 18 has a small thermal expansion coefficient of $1–10\times10^{-6}/°C$., the difference in thermal expansion coefficient between the honeycomb heater 12 and the insulation portion must be as small as possible. When the heater unit of the present invention is used for purification of automotive exhaust gases, L is preferably in the range of 0.5–10 mm. When L is smaller than 0.5 mm, no strong cementing is ensured against vibration. When L is larger than 10 mm, the cementing material 18 may be broken by the difference in thermal expansion between the cementing material 18 and the honeycomb structure 10.

The depth D of the cementing portion (this D is nearly the same as the depth of the groove 13) is preferably in the range of 2–10 mm so that the D does not largely reduce the cross-sectional area of the portion of the honeycomb heater 12 through which a gas can pass and yet the D can afford a sufficient cementing strength.

The thickness t of the cementing material 18 is preferably 1 mm or smaller. When the t is larger than 1 mm, the adhesion strength is low and breakage may occur. The t is more preferably 0.01–0.5 mm.

In other example of the insulation portion, brazing may be conducted using an insulating material and a brazing material.

Figure 13A:
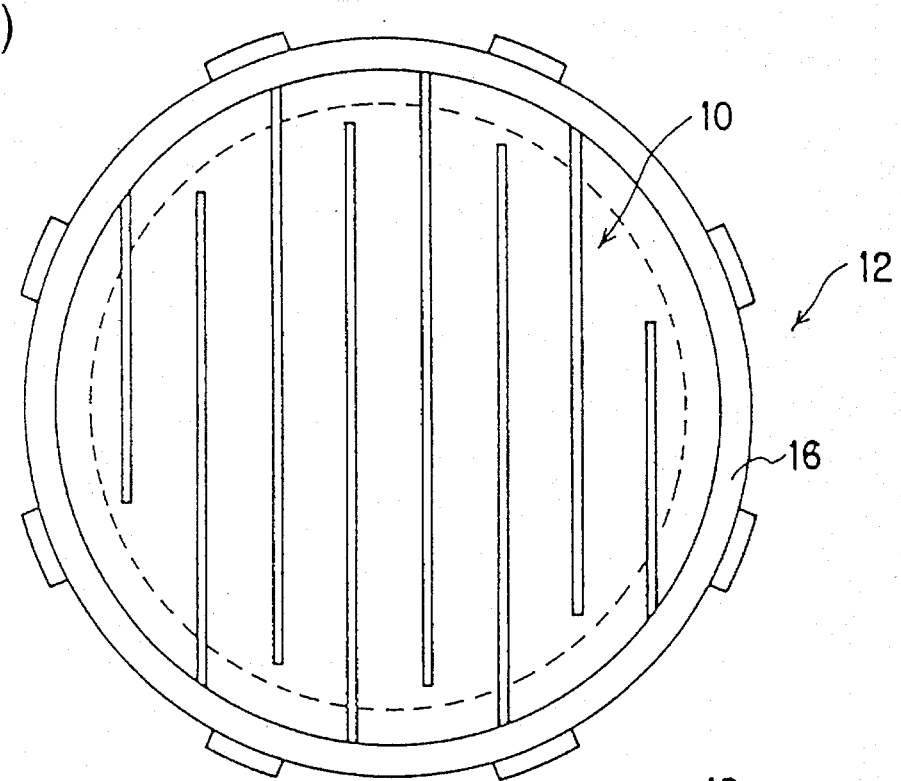
FIGS. 13(A) and 13(B) show an example of the honeycomb heater having a supporting member, used in the present invention.
Figure 13B:
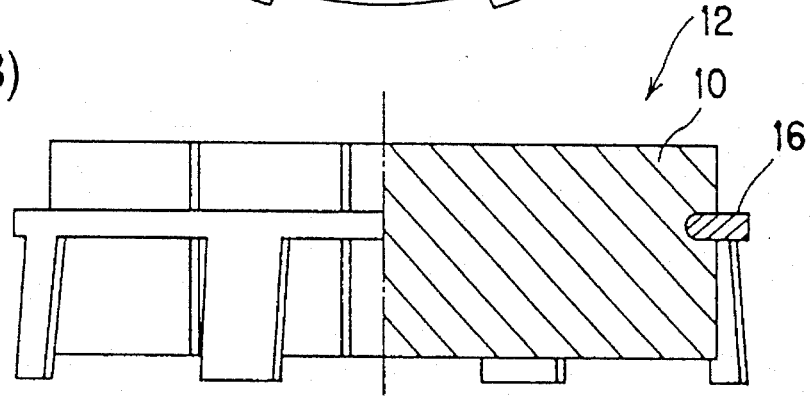
Figure 14:
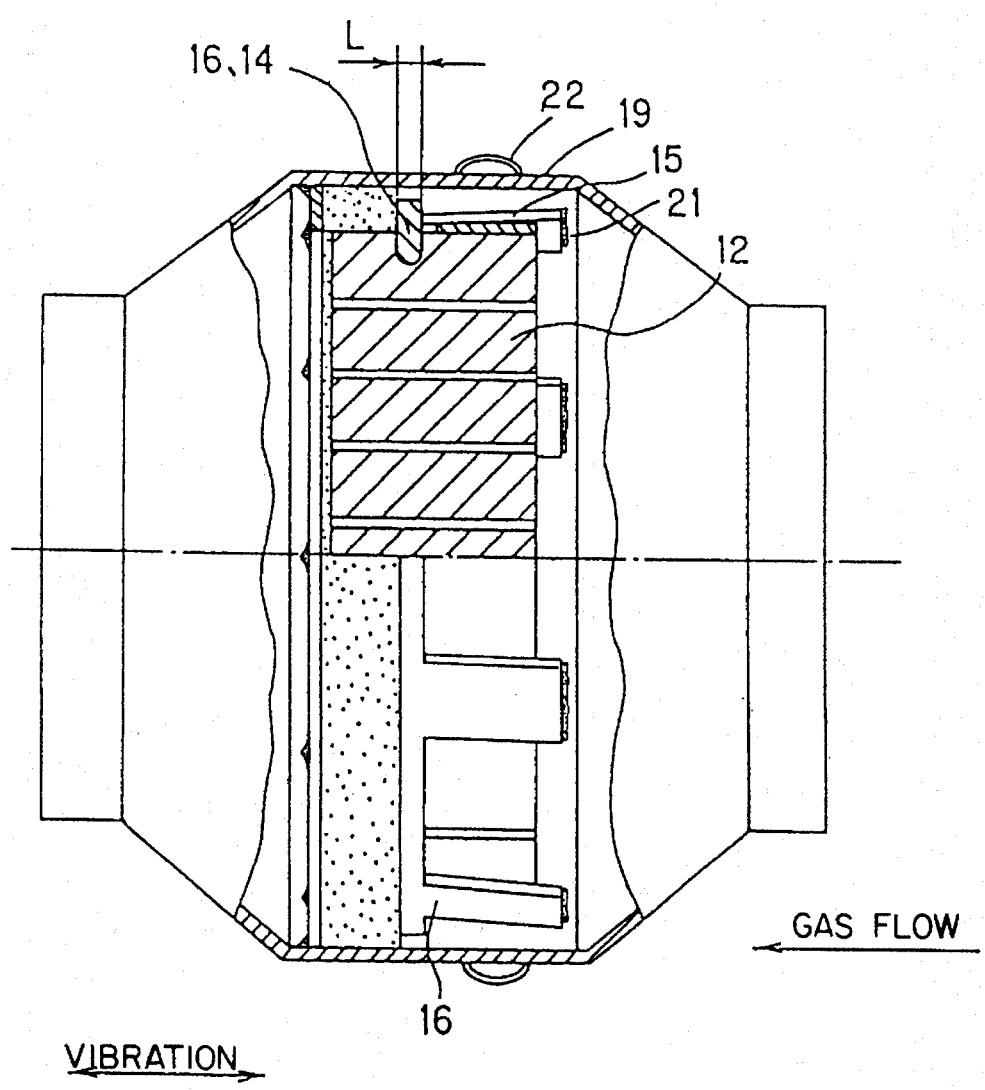
FIG. 14 is a partially cutaway sectional view showing an example of the heater unit according to the first aspect of the present invention.

As described above, two half-ring-shaped supporting members 16 are connected with a honeycomb heater 12, and the two supporting members 16 are joined to each other by welding, as shown in FIGS. 13(A) and 13(B), to obtain a honeycomb heater 12 to which a one-piece annular supporting member 16 is joined. This honeycomb heater 12 is held in a metallic casing 19, as shown in FIG. 14. That is, the leg portions 15 of the supporting member 16 are fixed to the casing 19 by means of welding, screwing, insertion, inlaying or the like.

The one-piece annular supporting member 16 has a thermal expansion coefficient preferably 1–2 times, more preferably 1–1.5 times that of the honeycomb heater 12. The linear distance between (1) the connection area (the groove 13) between the honeycomb heater 12 and the supporting member 16 and (2) the connection area 21 between the supporting member 16 and the casing 19 is preferably 20 mm or smaller. When the distance is larger than 20 mm, a larger displacement appears owing to the thermal expansion of the connection area 21 and the load at the connection area 21 is increased.

The thus obtained heater unit has the following features.

When the honeycomb heater 12 is heated and expanded at high temperatures, the one-piece annular supporting member 16 provided at the periphery of the heater 12 is also expanded while following the heat expansion of the heater 12; meanwhile, the leg portions 15 of the supporting member 16 are fastly fixed to the casing 19; as a result, the heater 12 resists displacement, for example, the vibration in the direction of gas flow and thereby exhibits high durability.

The electrode 22 for electrification and heating of the honeycomb heater 12 has no particular restriction, but is preferably an electrode connected to the honeycomb heater and the casing using a connecting member and a buffer member, as mentioned later, because such an electrode can absorb the displacement of the heater appearing in the radial direction.

Figure 15:
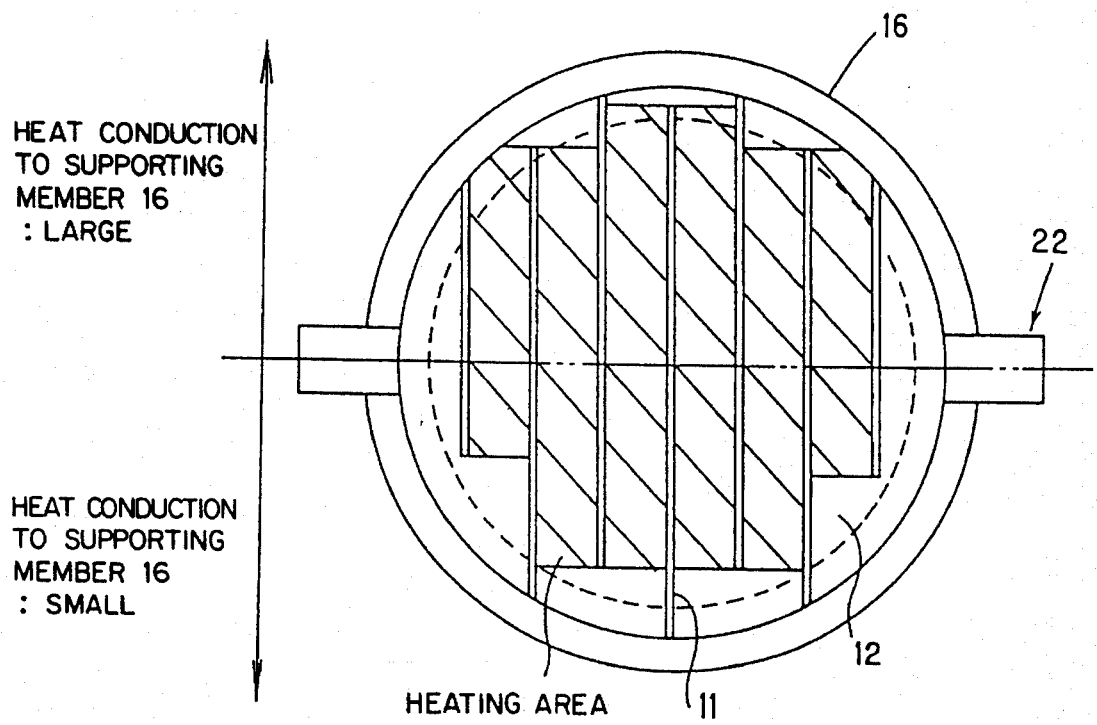
FIG. 15 is a plan view showing an example of the honeycomb heater having a supporting member, used in the present invention.

A preferable application example of the type A is shown in FIG. 15. That is, the length of each slit 11 is controlled to control the position of the dead end of each slit and thereby improve the heat conduction from the honeycomb heater 12 to the one-piece type supporting member 16 when the heater 12 is electrified, whereby the heat expansion of the supporting member 16 is allowed to follow the heat expansion of the heater 12 when the heater 12 is electrified. In FIG. 15, numeral 22 is an electrode.

Figure 16A:
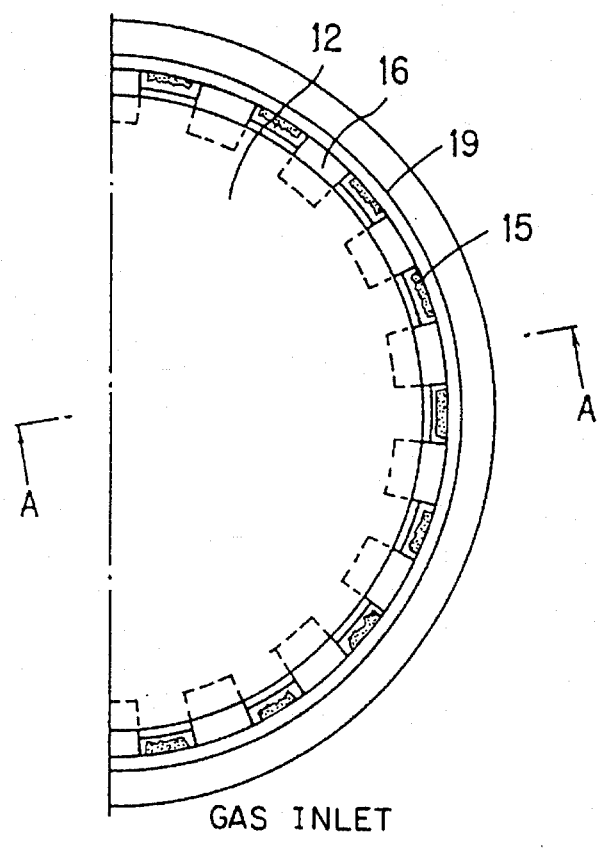
FIGS. 16(A), 16(B) and 16(C) show an example of the connection of a honeycomb heater and a casing via a supporting member, employed in the present invention.
Figure 16B:
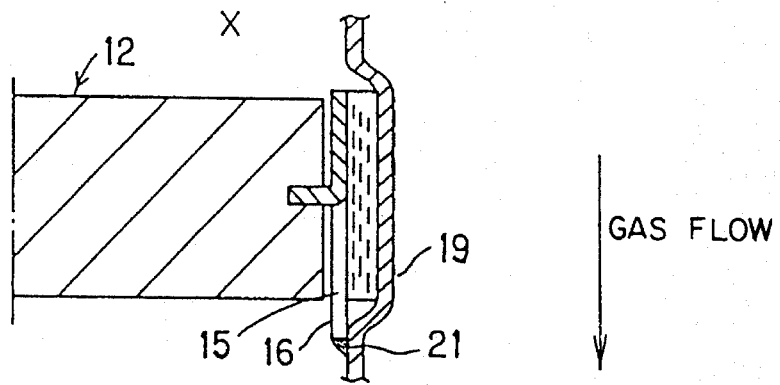
Figure 16C:
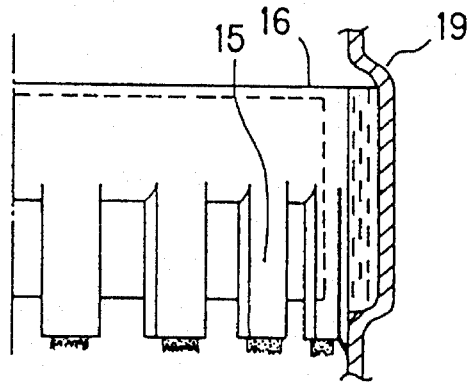

Another preferable application example of the type A is shown in FIGS. 16(A), 16(B) and 16(C), wherein part of the one-piece type supporting member 16 is projected toward the gas inlet side X of the heater 12 so that the temperature change of the supporting member 16 can better follow the temperature change of the heater 12.

Next, description is made on the heater unit of type B.

Figure 17A:
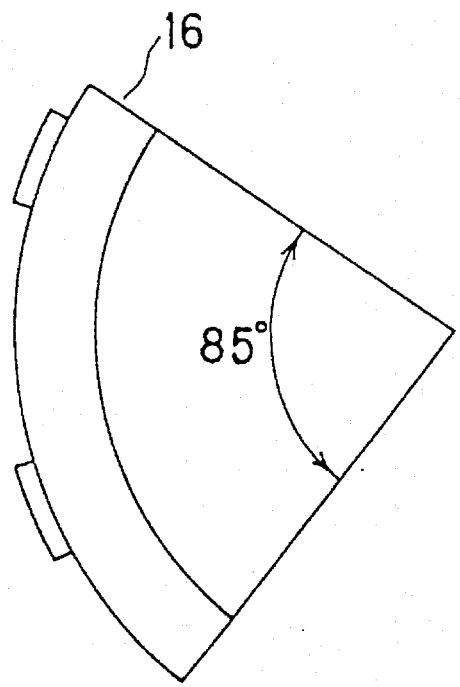
FIGS. 17(A) and 17(B) show other example of the supporting member used in the present invention.
Figure 17B:
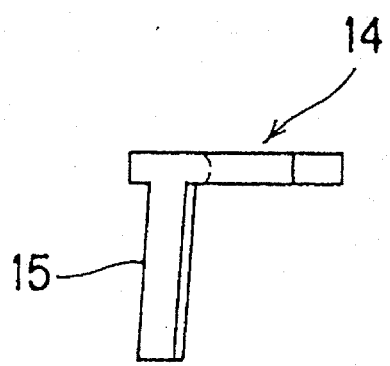
Figure 18A:
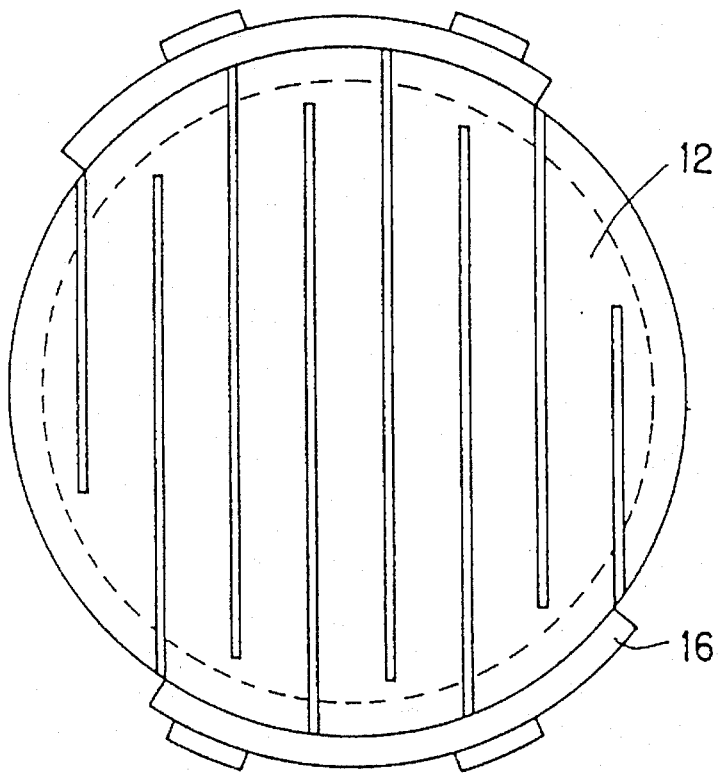
FIGS. 18(A) and 18(B) show other example of the heater unit used in the first aspect of the present invention.
Figure 18B:
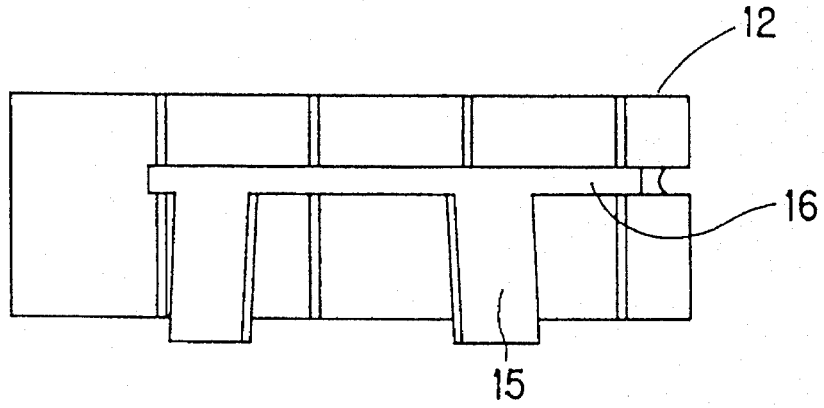

As mentioned above, the type A heater unit is a heater unit using a one-piece annular supporting member 16 obtained by joining two half annular supporting members 16 to each other. The type B heater unit is a heater unit obtained by engaging a plurality of arcuate supporting members 16 [shown in FIGS. 17(A) and 17(B)] in the groove 13 of a honeycomb heater 12 without joining the supporting members 16 to each other, as shown in FIGS. 18(A) and 18(B).

In the type B, since no one-piece type supporting member 16 is used unlike in the type A, the displacement of the honeycomb heater 12 in the radial direction due to the heat expansion at high temperatures is absorbed by the leg portions of the supporting members 16. Further, the displacement of the heater 12 in the direction of gas flow is resisted by the connection area between the arcuate portions 14 of the supporting members 16 and the casing, whereby the heater 12 is fixed.

Figure 19A:
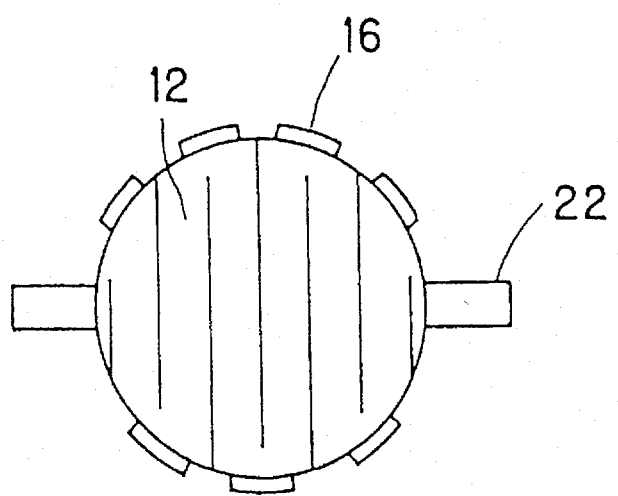
FIGS. 19(A) and 19(B) show still other example of the heater unit used in the first aspect of the present invention.
Figure 19B:
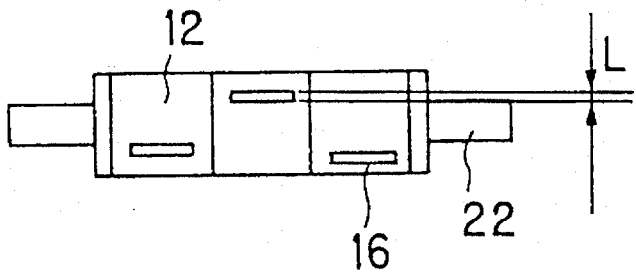

An application example of the type B is shown in FIGS. 19(A) and 19(B), wherein more than two supporting members 16 (seven supporting members) are used. All of the connection areas between each supporting member 16 and honeycomb heater 12 may not be on the same plane.

Next, description is made on the heater unit of type C.

Figure 20A:
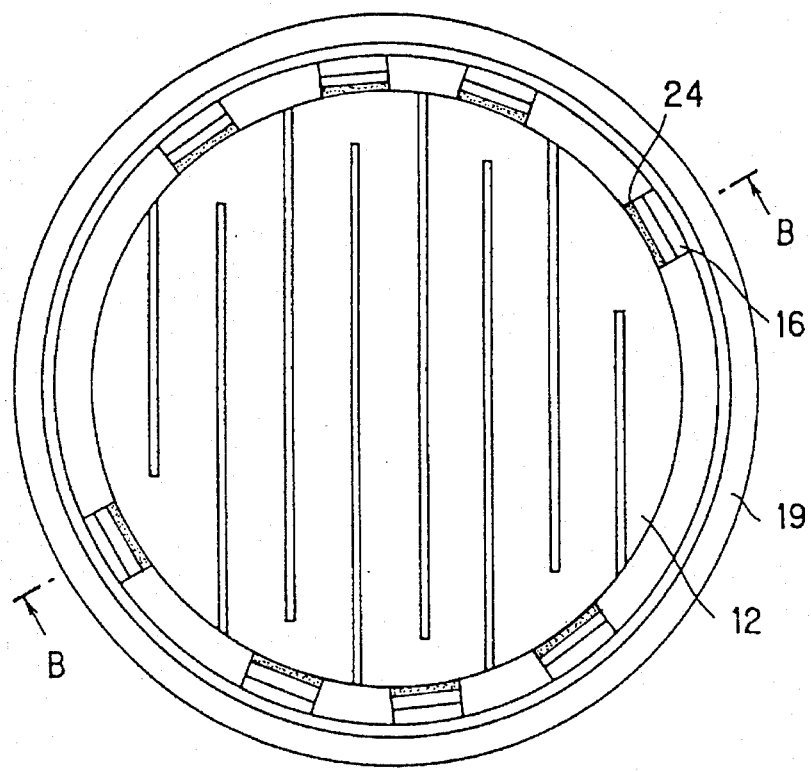
FIGS. 20(A) and 20(B) show still other example of the heater unit used in the first aspect of the present invention.
Figure 20B:
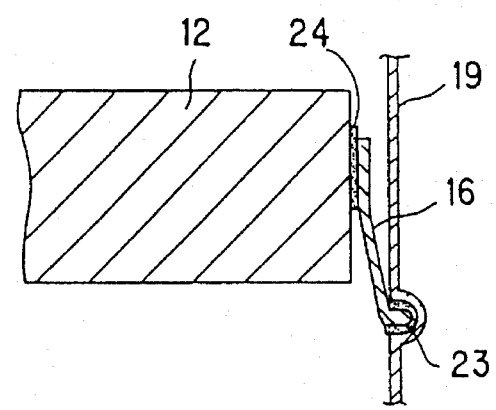

The type C heater unit is a heater unit having insulation portions at the connection areas between each supporting member 16 and casing 19, as shown in FIGS. 20(A) and 20(B).

Figure 21:
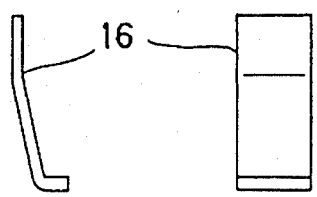
FIG. 21 shows the supporting member used in the heater unit of FIG. 20.

That is, a plurality of supporting members 16 each consisting of a crooked-shaped thin plate, such as shown in FIG. 21, are fixed onto the periphery of a honeycomb heater 12 by means of welding or the like. (Therefore, each supporting member 16 and the honeycomb heater 12 communicate with each other.) The end of each supporting member 16 to be connected with a casing 19 is coated with an insulating coating as necessary. Said end is further coated with a filler 23 (e.g., ceramic mat) and is inserted into a groove formed in the casing (consisting of two parts). The groove is caulked so that said end of each supporting member 16 and the filler 23 are contained in the groove. Then, the two parts of the casing 19 are connected. As a result, the casing 19 and the honeycomb heater 12 are insulated from each other, and the supporting members 16 have the same effects as in the types A and B.

Description is made on application examples of the types A, B and C.

The application examples shown in FIGS. 22 to 26 show the sectional views of various supporting members 16. Each supporting member 16 may be a one-piece annular supporting member, or may consist of a plurality of parts.

Figure 22:
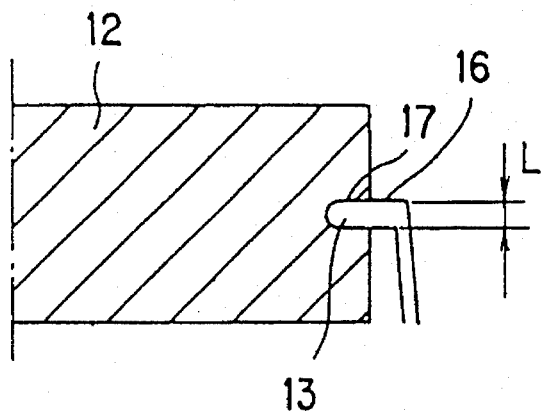
FIG. 22 shows an example of the connection of a honeycomb heater and supporting member(s), employed in the present invention.

FIG. 22 shows a supporting member having a round end at the portion to be connected with a honeycomb heater 12. Owing to the round end, an insulating coating 17 can have a higher film formability and, moreover, the stress concentration at the edge of the groove 13 of the honeycomb heater 12 can be relaxed.

Each of FIGS. 23 to 26 shows a case wherein strengthened portion(s) 24 is (are) beforehand provided at the periphery of or in the vicinity of the periphery of a honeycomb heater 12 and wherein supporting member(s) 16 is (are) fastly connected with the strengthened portion(s) 24. The strengthened portion(s) 24 can be produced, when powder metallurgy is employed, by joining, to a dried honeycomb heater 12, a dried or undried body having the same composition as the honeycomb heater 12, processed so as to have a desired shape and then firing the body-joined honeycomb heater. Owing to the strengthened portion(s) 24, the connection area(s) between the honeycomb heater 12 and the supporting member(s) 16 has (have) a higher strength.

Figure 23:
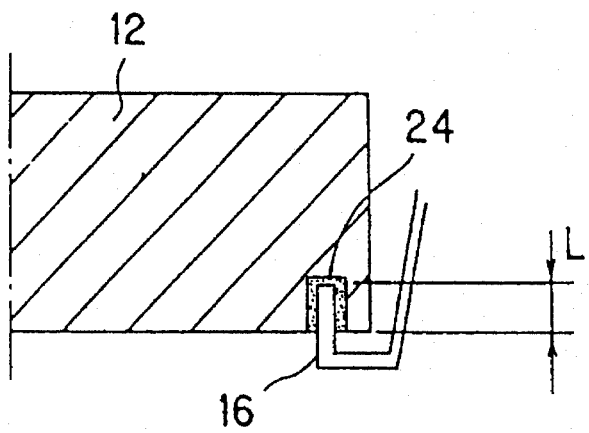
FIG. 23 shows an example of the connection of a honeycomb heater and supporting member(s), employed in the present invention.
Figure 24:
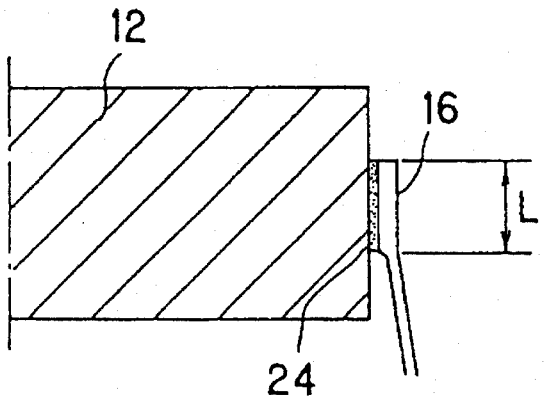
FIG. 24 shows an example of the connection of a honeycomb heater and supporting member(s), employed in the present invention.
Figure 25:
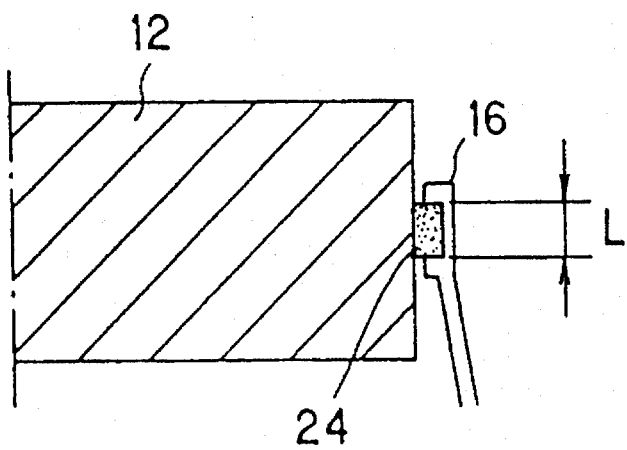
FIG. 25 shows an example of the connection of a honeycomb heater and supporting member(s), employed in the present invention.
Figure 26:
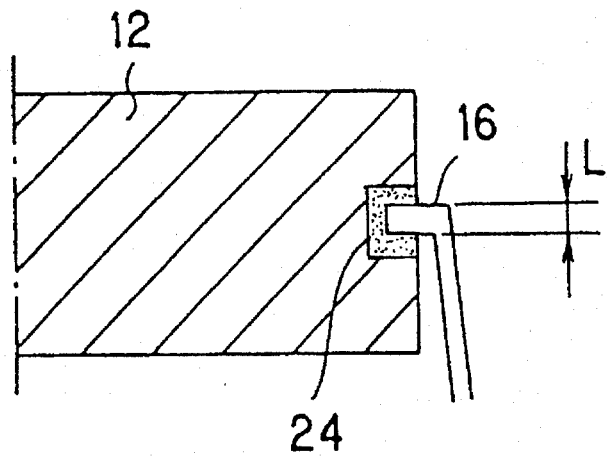
FIG. 26 shows an example of the connection of a honeycomb heater and supporting member(s), employed in the present invention.

Incidentally, FIG. 23 shows a case wherein the connection area(s) between a honeycomb heater 12 and supporting member(s) 16 is (are) in the vicinity of the periphery of the honeycomb heater 12.

Figure 27:
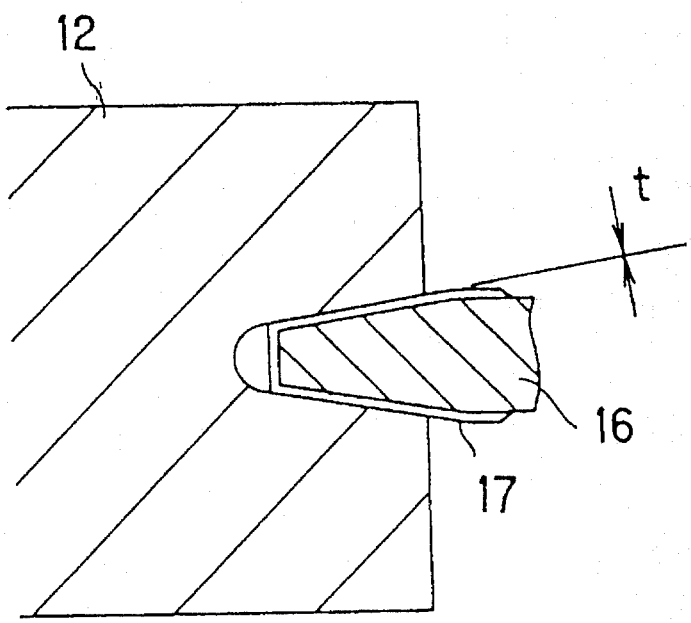
FIG. 27 is a fragmentary sectional view showing other example of the periphery of the honeycomb heater used in the present invention.
Figure 28:
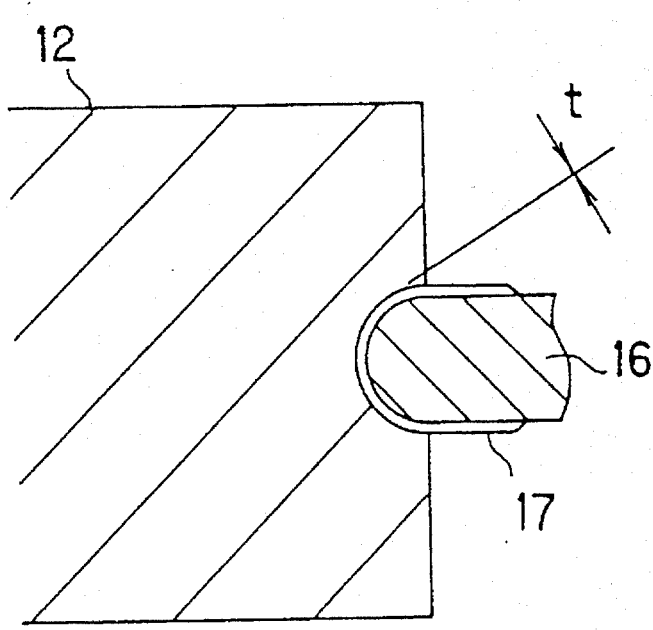
FIG. 28 is a fragmentary sectional view showing still other example of the periphery of the honeycomb heater used in the present invention.

FIGS. 27 and 28 are application examples of the connection between supporting member and honeycomb heater, shown in FIG. 12. In these examples, each supporting member 16 has a different sectional shape at the connection area between honeycomb heater and supporting member. In FIG. 27, the groove 13 of a honeycomb heater 12 and the arcuate portion 14 of a supporting member 16 are formed so as to have a taper against a plane parallel to the radical direction of the honeycomb heater 12. In FIG. 28, the groove 13 of a honeycomb heater 12 and the arcuate portion of a supporting member 16 are formed so as to have a roundness. Owing to these structures, each connection area between supporting member 16 and honeycomb heater 12 can have a smaller clearance, whereby a higher adhesion strength can be obtained.

Figure 29:
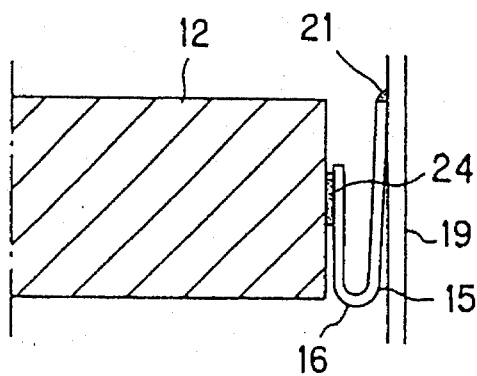
FIG. 29 shows an example of the connection of a honeycomb heater and a casing via supporting member(s), employed in the present invention.

FIG. 29 shows a supporting member 16 having a U-shaped section. This U-shaped structure functions as a spring against the displacement of a honeycomb heater 12 in its radial direction.

Figure 30A:
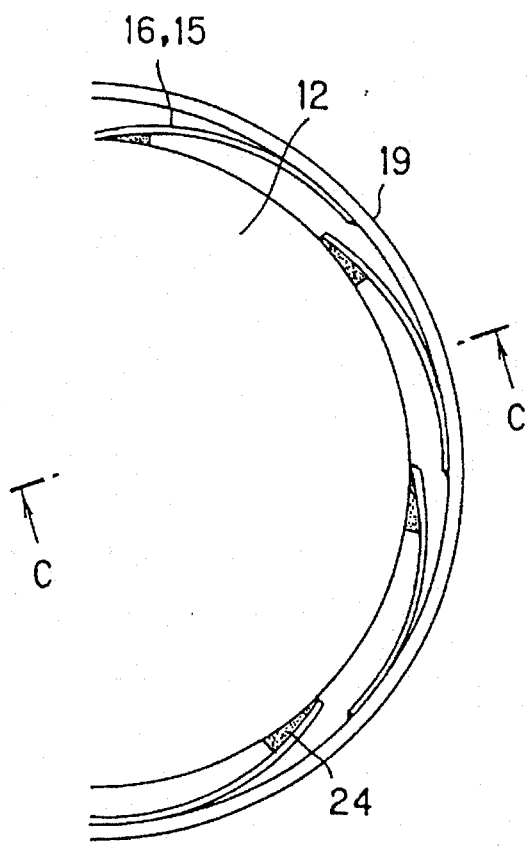
FIGS. 30(A) and 30(B) show still other example of the heater unit according to the first aspect of the present invention.
Figure 30B:
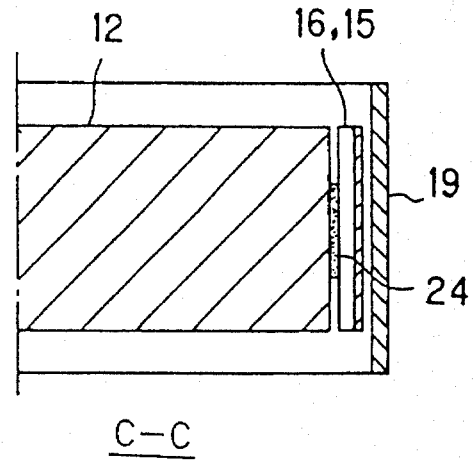

FIGS. 30(A) and 30(B) show a case wherein plate-like supporting members 16 are provided at the periphery of a honeycomb heater 12 in a swirl shape. These supporting members 16 function as a spring against the displacement of the honeycomb heater 12 in its radial direction.

Figure 31A:
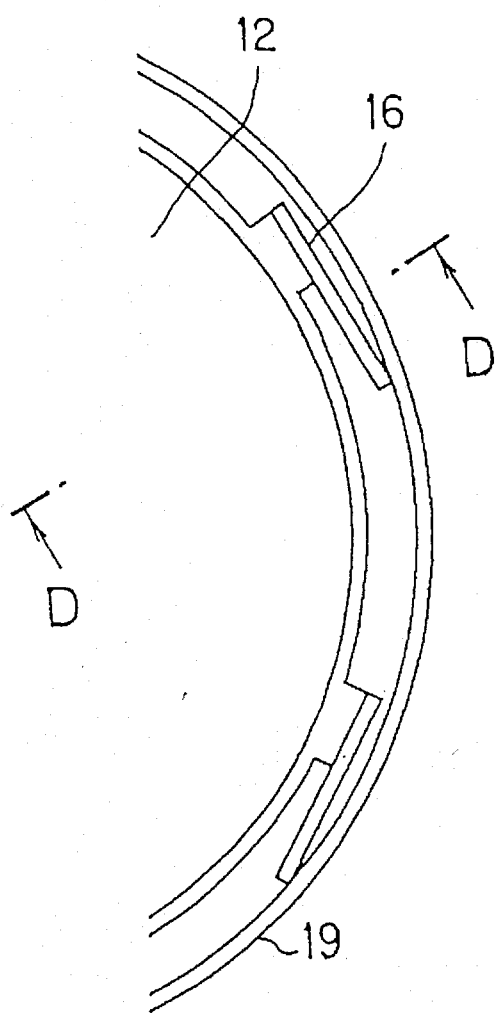
FIGS. 31(A) and 31(B) show still other example of the heater unit according to the first aspect of the present invention.
Figure 31B:
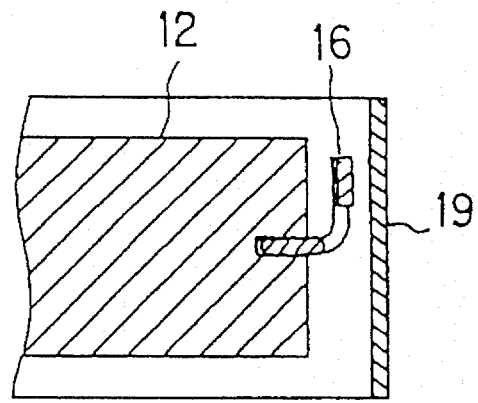
Figure 37:
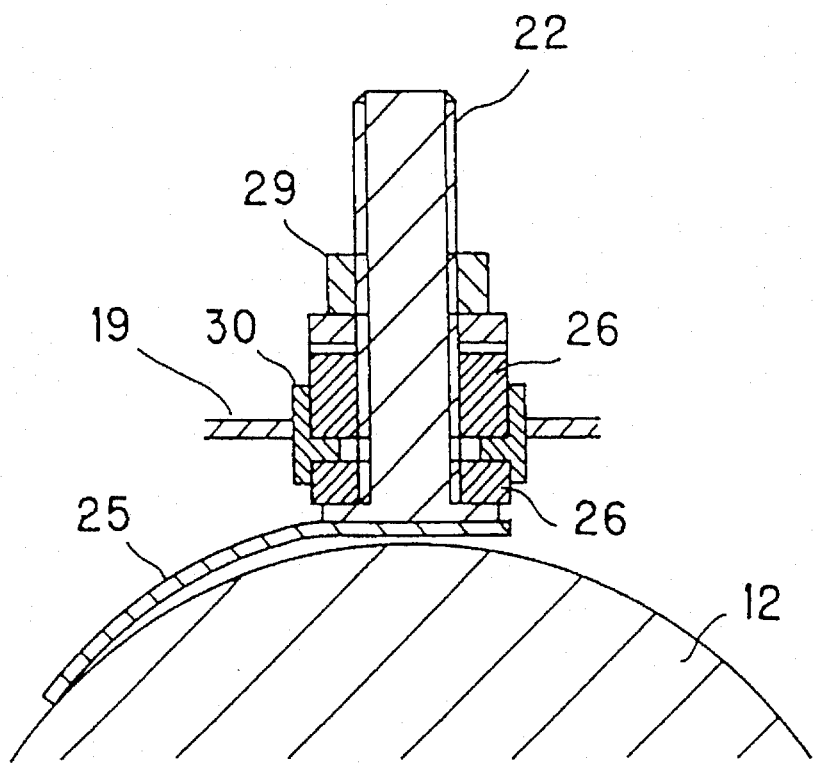
FIG. 37 is a fragmentary sectional view showing an example of the electrode structure used in the second aspect of the present invention.

FIGS. 31(A) and 31(B) show a case wherein a supporting member 16 is connected with a honeycomb heater 12 via the latter's groove and, as in FIGS. 30(A) and 30(B), has spring portions in a swirl shape at the periphery of the heater 12. Since the supporting members 16 shown in FIGS. 30(A) and 30(B) and FIGS. 31(A) and 31(B) have spring portions at the periphery of each honeycomb heater 12 in a swirl shape, the length of supporting member in gas flow direction can be made shorter than those of other type supporting members. When the supporting member 16 is used in combination with an electrode as shown in FIG. 37, the direction of the swirl of the supporting member 16 and that of the connecting member 25 of the electrode are preferably coincidental with each other because the direction of thermal expansion and thermal shrinkage of the supporting member 16 coincides with that of the connecting member 25 and thereby no interference is caused.

Figure 32:
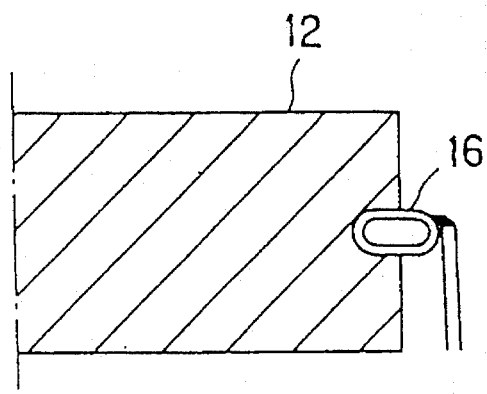
FIG. 32 shows an example of the connection of a honeycomb heater and a supporting member, employed in the present invention.
Figure 33:
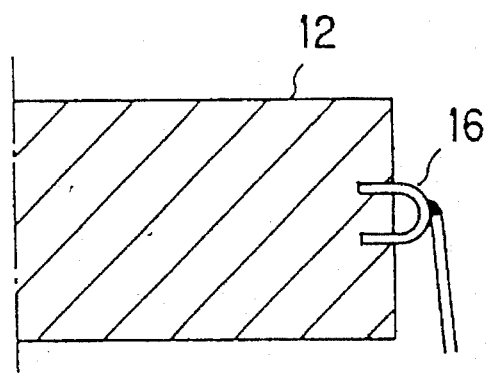
FIG. 33 shows an example of the connection of a honeycomb heater and a supporting member, employed in the present invention.
Figure 34:
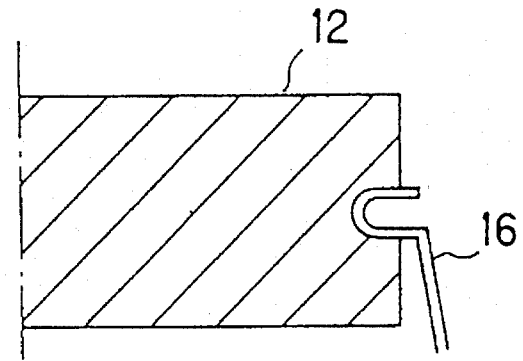
FIG. 34 shows an example of the connection of a honeycomb heater and a supporting member, employed in the present invention.
Figure 35:
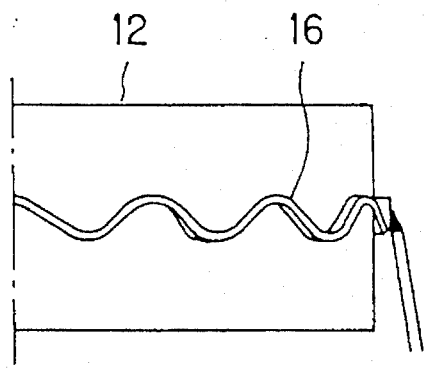
FIG. 35 shows an example of the connection of a honeycomb heater and a supporting member, employed in the present invention.
Figure 36:
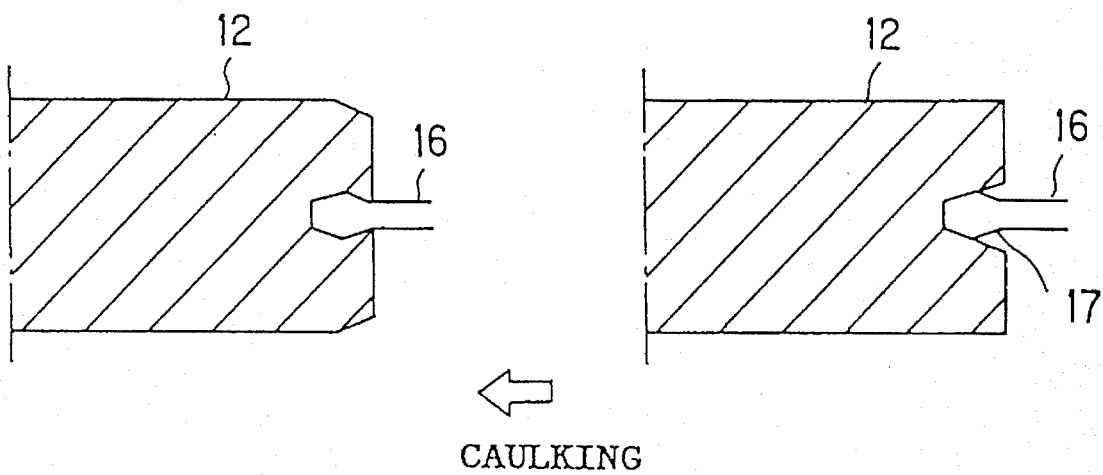
FIG. 36 shows an example of the connection of a honeycomb heater and a supporting member, employed in the present invention.

FIGS. 32 to 35 show cases wherein a supporting member 16 is made lighter at the area connecting with a honeycomb heater 12 while maintaining the strength at said area, in order to be able to quickly follow the temperature change of the honeycomb heater 12. That is, FIG. 32 is a case wherein the arcuate portion 14 of a supporting member 16 is made of a hollow ring; FIGS. 33 and 34 are each a case wherein the arc portion 14 of a supporting member 16 is made of a ring having a U-shaped section; and. FIG. 35 is a case wherein the arc portion of a supporting member 16 is formed in a wave shape so that the connection area between honeycomb heater 12 and supporting member 16 can have a larger strength FIG. 36 is a case wherein a supporting member 16 has a polygonal sectional shape at the front end. An insulating coating 17 is coated on said front end; the coated front end is inserted into the groove of a honeycomb heater 12 (no cementing material is used); and the mouth of the groove is caulked.

In the first aspect of the present invention, each of the honeycomb heater and the supporting member(s) for holding the heater, desirably has an intrinsic frequency of 500 Hz or more, preferably 1,000 Hz or more, more preferably 2,000 Hz or more in the vibration of gas flow direction or radial direction of honeycomb heater so that the honeycomb heater and the supporting member(s) do not vibrate synchronously with the exhaust pipe of automobile and are not broken.

In order to increase the intrinsic frequency of the honeycomb heater in the direction of gas flow, an effective means is, for example, to increase the thickness of the heater in the gas flow direction. In order to increase the intrinsic frequency of the honeycomb heater in the radial direction, an effective means is to increase the number of cells between two adjacent slits. These means, however, result in decrease in the resistance of the honeycomb heater. Therefore, in order to obtain a heater unit having a desired resistance, it is necessary to design a honeycomb heater so as to have an appropriate diameter, an appropriate thickness in gas flow direction, an appropriate number of slits, etc. as well as an intrinsic frequency satisfying the above requirement.

In order to increase the intrinsic frequency of the supporting member(s), an effective means is, for example, to make small the length of each leg, make large the width of each leg, or increase the number of legs. When the length of each leg is too small, the leg portions come to have a large stress owing to the difference in heat expansion between arc portion(s) of supporting member(s) and casing, leading to fatigue breakage. It is therefore necessary to design supporting member(s) so as to have a stress of 30 kg/mm$^2$ or less, preferably 15 kg/mm$^2$ or less as well as an intrinsic frequency satisfying the above requirement.

Next, description is made on the second aspect of the present invention.

In the second aspect, the heater unit must have at least one electrode for electrification of the honeycomb heater. Ordinarily, electrodes are directly connected with a honeycomb structure by welding or the like to form a honeycomb heater; then, the electrodes are fixed to a casing via an insulator or the like to form a heater unit; in this heater unit, the electrodes may deform the honeycomb heater owing to the relative displacement between casing and honeycomb heater, caused by their difference in heat expansion. Hence, there arises a necessity of improving the connection between electrodes and honeycomb heater. Such an example of improved connection between electrodes and honeycomb heater is hereinafter described in detail as the heater unit of type D.

A typical example of the type D heater unit is shown in FIG. 37. As shown in FIG. 37, a honeycomb heater 12 is connected with an electrode 22 via a metallic connecting member 25. The connecting member 25 must have functions of (1) absorbing the displacement of the honeycomb heater 12 appearing in the radial direction and (2) fixing the honey-comb heater 12 in the direction of gas flow. Therefore, the connecting member 25 can be made of the same material and can have the same shape as used in the aforementioned supporting member. Needless to say, the connecting member 25 must have a very small electrical resistance in order to ensure the desired heat generation by the honeycomb heater.

The connection between connecting member 25 and honeycomb heater 12 and between connecting member 25 and electrode 22 can be conducted by an appropriate means such as welding or the like.

The electrode 22 is fastly fixed to a casing 19 by a washer and a nut 29 via insulating members 26 consisting of an insulating material (e.g. insulator) and a jig 30 for fixing the insulating member 26.

In the type D heater unit, since the electrode 22 is fixed to the honeycomb heater 12 via the connecting member 25, a risk of breakage of the honeycomb heater 12 is small even when an external impact is applied to the electrode 22.

Figure 38:
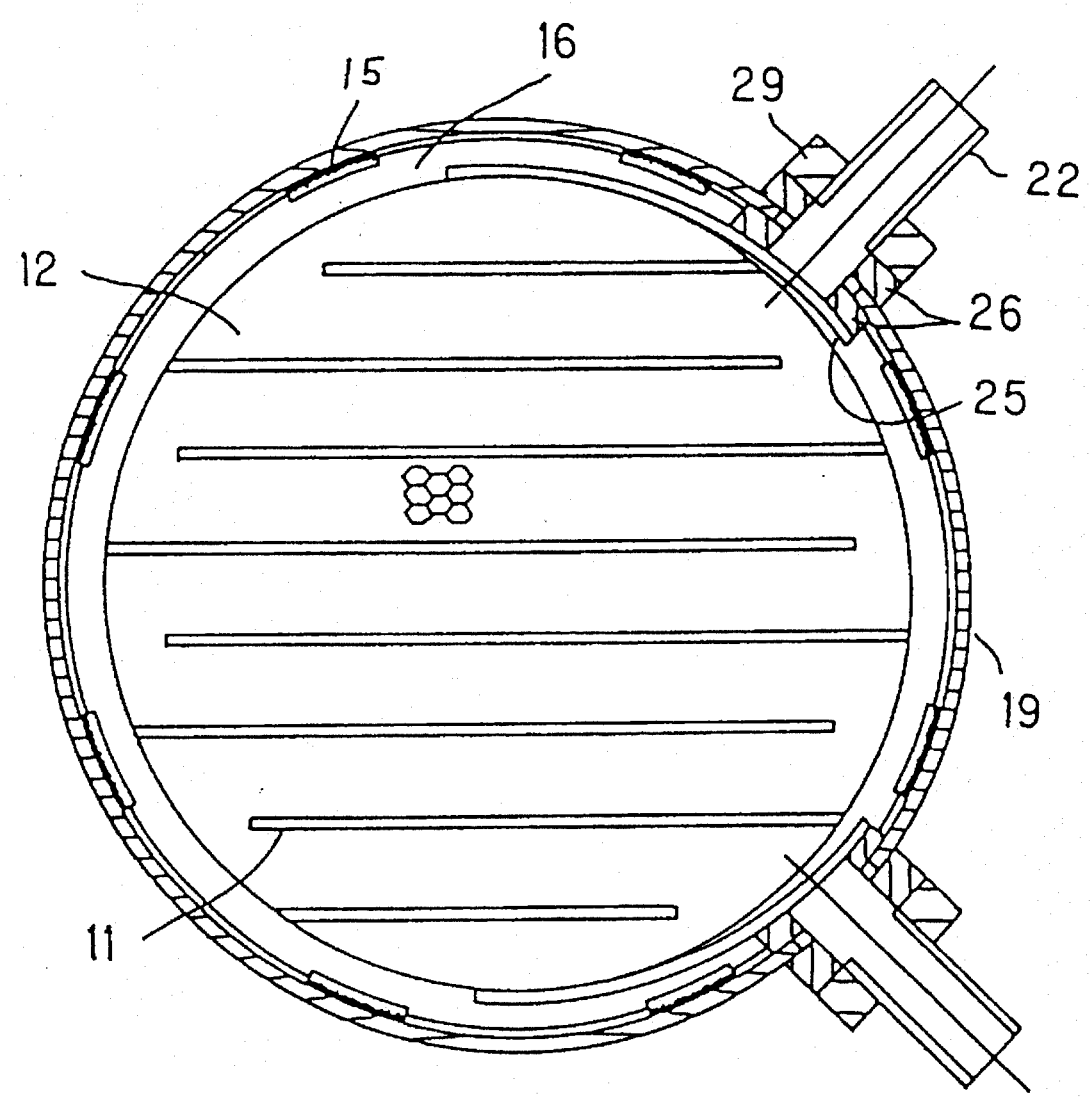
FIG. 38 is a plan view showing an example of the heater unit of the first aspect of the present invention, having the electrode structure used in the second aspect of the present invention.

The heater unit of FIG. 38 is an example of the type D wherein a honeycomb heater 12 is held in a casing 19 by a supporting member 16 according to the same holding method as in the type A. The type D can be effectively applied to various other examples than the example of FIG. 38.

Figure 39A:
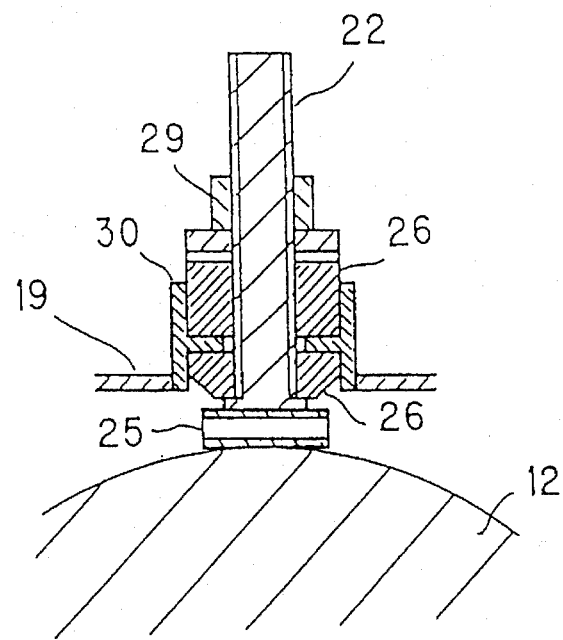
FIGS. 39(A) and 39(B) show other example of the electrode structure used in the second aspect of the present invention.
Figure 39B:
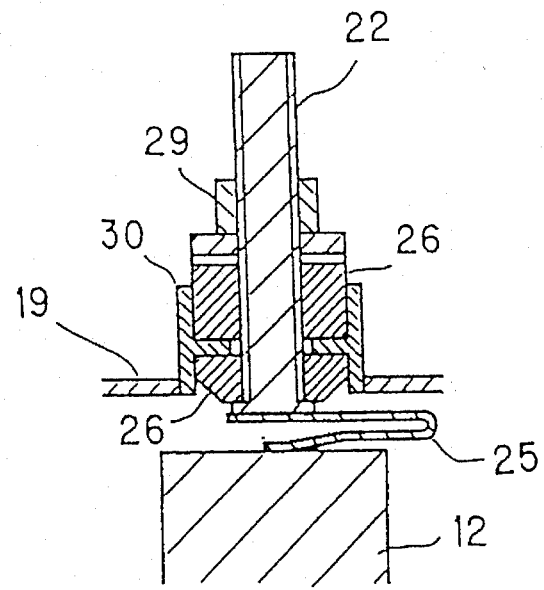

Another preferable example of the type D heater unit is shown in FIGS. 39(A) and 39(B), wherein a connecting member 25 having a nearly U-shaped section, obtained by folding a metallic plate is provided between an electrode 22 and a honeycomb heater 12.

In the second aspect of the present invention, the connecting member provided between electrode and honeycomb heater, has a spring function so as to be able to absorb the displacement caused by the difference in heat expansion between honeycomb structure and casing. The spring force of the connecting member is desirably 4 kgf/mm or less, preferably 1 kgf/mm or less in terms of spring modulus, per unit length of honeycomb heater in gas flow direction. When the spring modulus is larger than 4 kgf/mm, the spring force of the connecting member is too large and, as a result, the connecting member may smash the honeycomb portion of honeycomb heater close to the connecting member. Further, the connecting member preferably has a sectional area of 8 mm$^2$ or more, preferably 15 mm$^2$ or more and a length of 50 mm or less, preferably 20 mm or less in order to minimize the temperature elevation and consequent expansion of the connecting member when electrified. When the sectional area and the length deviate from the above ranges, the connecting member may be melted by abnormal temperature elevation, or the connecting member may expand too much and a large stress may appear in the connecting member, the electrode and the honeycomb heater (the electrode and the honeycomb heater are in contact with the connecting member); consequently, breakage may appear. Since the decrease in spring modulus of connecting member opposes the increase in sectional area and decrease in length of connecting member, the connecting member must be designed so as to have a good balance in these properties.

Next, the third aspect of the present invention is described.

The third aspect also has a feature in its electrode structure, similarly to the second aspect.

Figure 40:
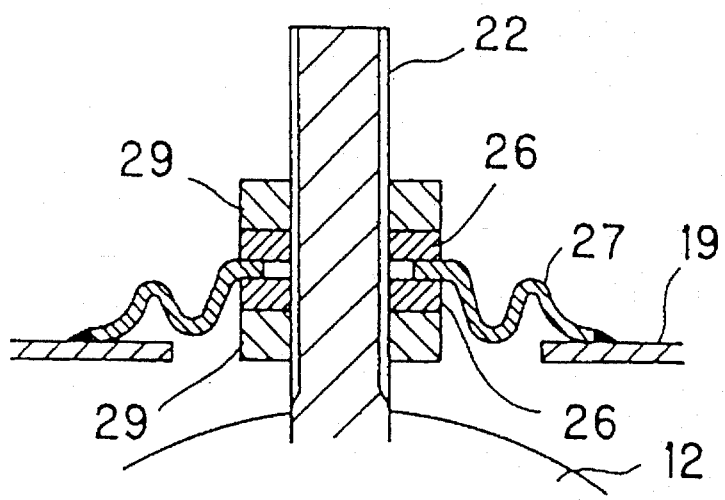
FIG. 40 is a fragmentary sectional view showing an example of the electrode structure used in the third aspect of the present invention.
Figure 41:
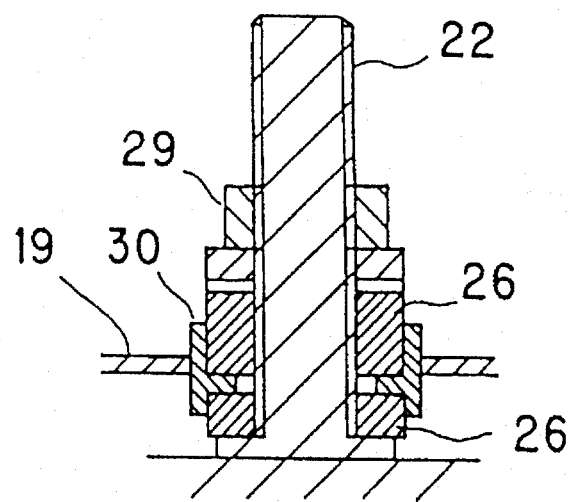
FIG. 41 is a fragmentary sectional view showing an example of the conventional electrode structure of fastly fixed type.

An example of the third aspect is shown as type E, and its electrode structure is shown in FIG. 40.

As shown in FIG. 40, an electrode 22 is directly connected with a honeycomb heater 12 by means of welding or the like and further is connected with insulating members 26 consisting of an insulating material (e.g. insulator) by nuts 29; and the insulating members 26 are fixed to a casing 19 via a buffer member 27. The buffer member 27, similarly to the aforementioned supporting member and connecting member, absorbs the displacement of the honeycomb heater 12 in its radial direction and can fix the honeycomb heater 12 against its displacement in the direction of gas flow.

In the third aspect, the buffer member, similarly to the connecting member of the second aspect, desirably has a spring modulus of 4 kgf/mm or less, preferably 1 kgf/mm or less per unit length of honeycomb heater in gas flow direction. When the spring modulus is larger than 4 kgf/mm, the spring force of the buffer member is too large and, as a result, the buffer member may smash the honeycomb portion of honeycomb heater close to the buffer member.

When the type D heater unit according to the second aspect and the type E heater unit according to the third aspect employ the supporting member(s) used in the type A, B, C or the like, such heater units show substantially neither deformation nor breakage of honeycomb heater and are most preferable.

The present invention is hereinafter described in more detail referring to Examples. However, the present invention is not restricted to these Examples.

EXAMPLES 1–3

(1) Preparation of Honeycomb Heaters

Production of Honeycomb Structures

A Fe powder, a Cr—Al powder (Al: 30% by weight), a Fe-Al powder (Al: 50% by weight), a Fe-B powder (B: 20% by weight) and a $Y_2O_3$ powder all having an average particle diameter of 44 μm or less were mixed so as to give a composition of Fe-12Cr-10Al-0.05B-0.5$Y_2O_3$. To the mixture were added 4 g, per 100 g of the mixture, of methyl cellulose as an organic binder and 1 g of oleic acid as an antioxidant, and they were mixed to obtain a readily formable body. The body was extruded to obtain, as an extrudate, a columnar honeycomb body having a diameter of 108 mm and a thickness of 9.6 mm.

Figure 42A:
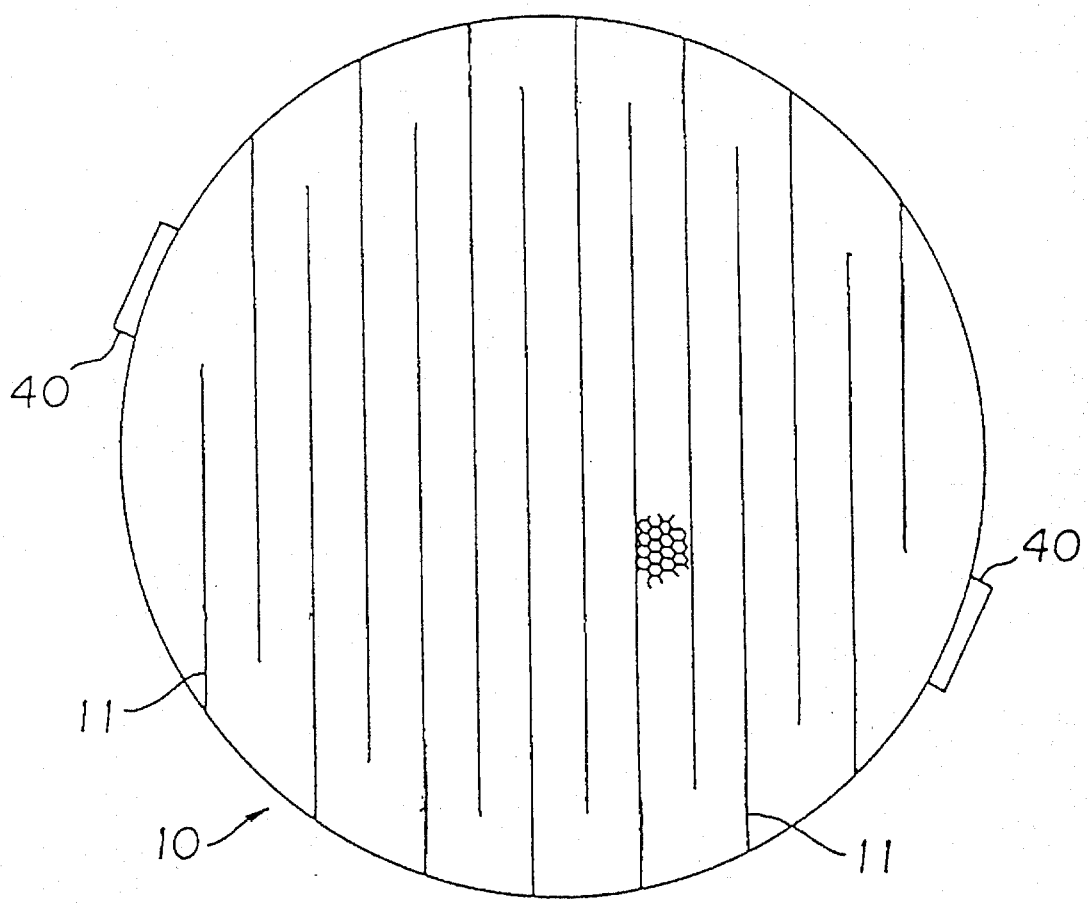
FIG. 42(A) and FIG. 42(B) show an example of the honeycomb structure used in the present invention.

There were prepared two plates 40 each having the same composition as above and a dimension of 2 mm (thickness), 9.6 mm (width) and 15 mm (length). The plates 40 were adhered to the two ends of the above-obtained honeycomb body which were on the same diameter, as shown in FIG. 42(A).

Figure 42B:
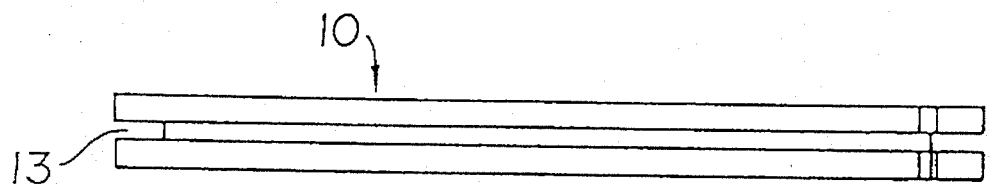

The columnar honeycomb body was dried in air at 90° C. for 16 hours and then sintered in a hydrogen atmosphere at 1,325° C. for 2 hours to obtain a honeycomb structure of 89 mm in outside diameter and 8 mm in thickness comprising hexagonal cells each having a rib thickness of 0.1 mm, at a cell density of 450 cells/in.$^2$. Then, at the periphery of the honeycomb structure was formed, by cylindrical grinding, a groove 13 of 1.8 mm in width and 5 mm in depth. Further, in the honeycomb structure were formed, by grinding using a diamond saw, slits 11 in a direction parallel to the axial direction of the passages (cells) so that the number of cells between two adjacent slits became four. The resulting honeycomb structure was heat-treated in air at 1,150° C. for 30 minutes, to obtain a honeycomb structure 10 as shown in FIGS. 42(A) and 42(B).

Loading of Catalyst

A $\gamma$-$Al_2O_3$ powder and a $CeO_2$ powder were separately prepared so that their weight ratio became 70:30. Each powder was mixed with water and a small amount of nitric acid, and each mixture was pulverized by a wet method to obtain two slurries. The previously prepared honeycomb structure 10 was dipped in each of the slurries to form a washcoat layer. The washcoat layer was dried and then fired at 500° C. to form a $\gamma$-$Al_2O_3$ and $CeO_2$ layer. The resulting honeycomb structure was dipped in an aqueous solution containing chloroplatinic acid and rhodium nitrate, to load thereon Pt and Rh at a molar ratio of 5:1 in a total amount of 40 g/ft$^3$.

Figure 43:
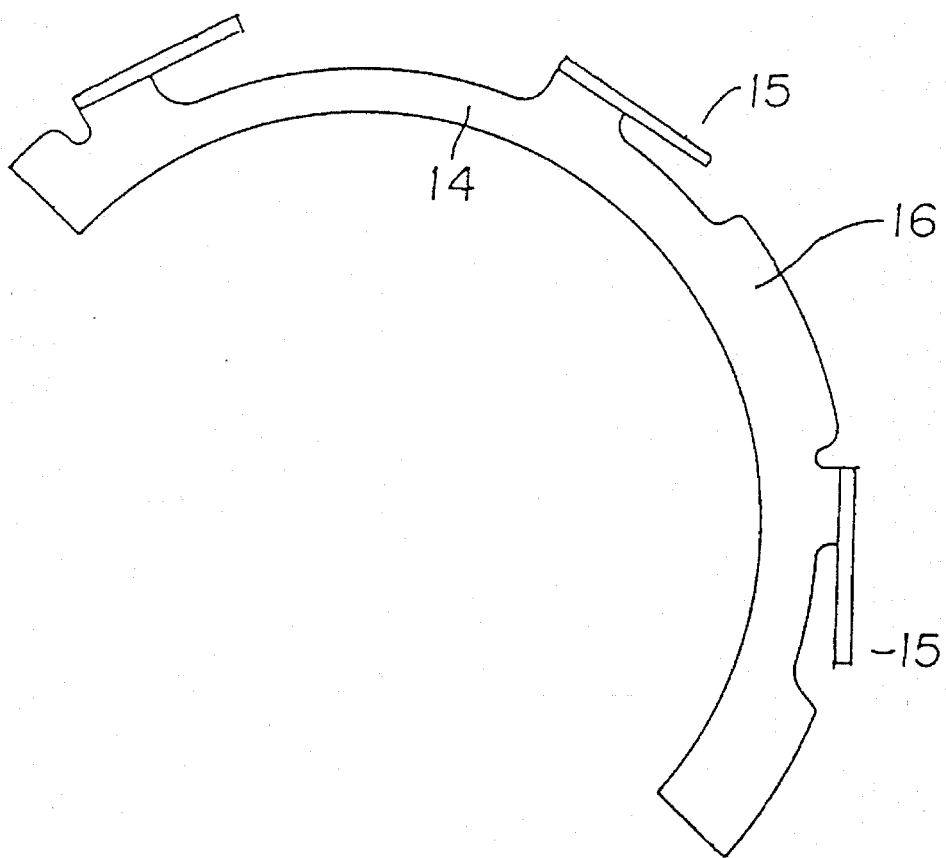
FIG. 43 is a plan view showing other example of the supporting member used in the present invention.

Separately, there were prepared two SUS 310S-made supporting members 16 as shown in FIG. 43, each having (1) a half-ring-shaped arc portion 14 having a thickness of 1.5 mm, an outer circumference of R=44 mm and an inner circumference of R=40.0 mm and (2) six legs 15 each having a thickness of 1.5 mm, a width of 8 mm and a length of 12.5 mm. Each arc portion 14 of the supporting members 16 was coated with alumina in a thickness of 20–25 μm by flame spraying to form an insulating coating.

Figure 44:
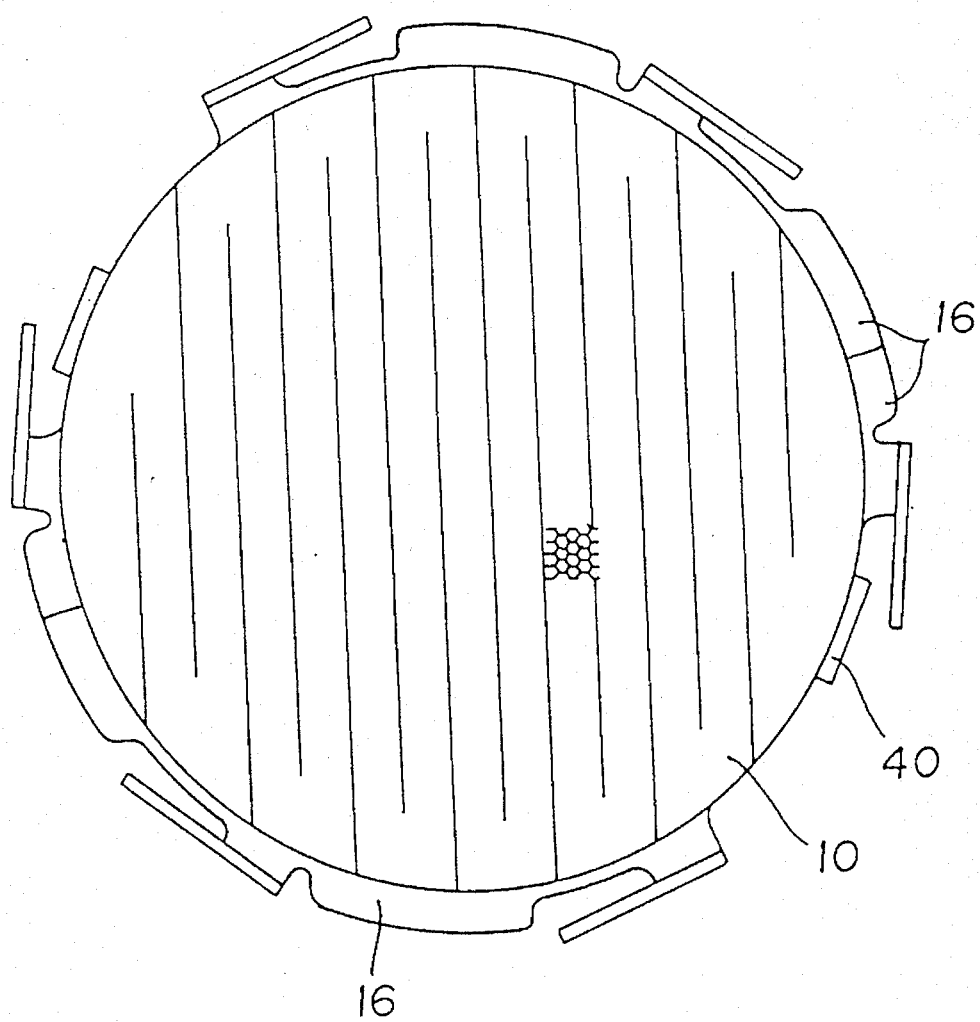
FIG. 44 is a plan view showing other example of the honeycomb heater having supporting members, used in the present invention.

Then, into the portion of each slit 11 formed in the honeycomb structure 10, other than the groove portion 13 was inserted a spacer having a thickness of 0.8 mm, to temporarily plug up the slit. Thereafter, an inorganic cement was filled in the groove portion 13, after which the two supporting members 16 were inserted into the groove 13. The resulting material was dried in air at 100° C. for 1 hour and then at 300° C. for 1 hour, whereby the supporting members 16 were fixed to the honeycomb structure 10. Incidentally, the inorganic cement was Bond X #96 (made mainly of $SiO_2$—$Al_2O_3$) manufactured by Nihon Kagaku Kogyo. After the drying, the spacer was removed, and the two supporting members 16 were connected at their ends by welding, for cyclization as shown in FIG. 44.

Figure 45:
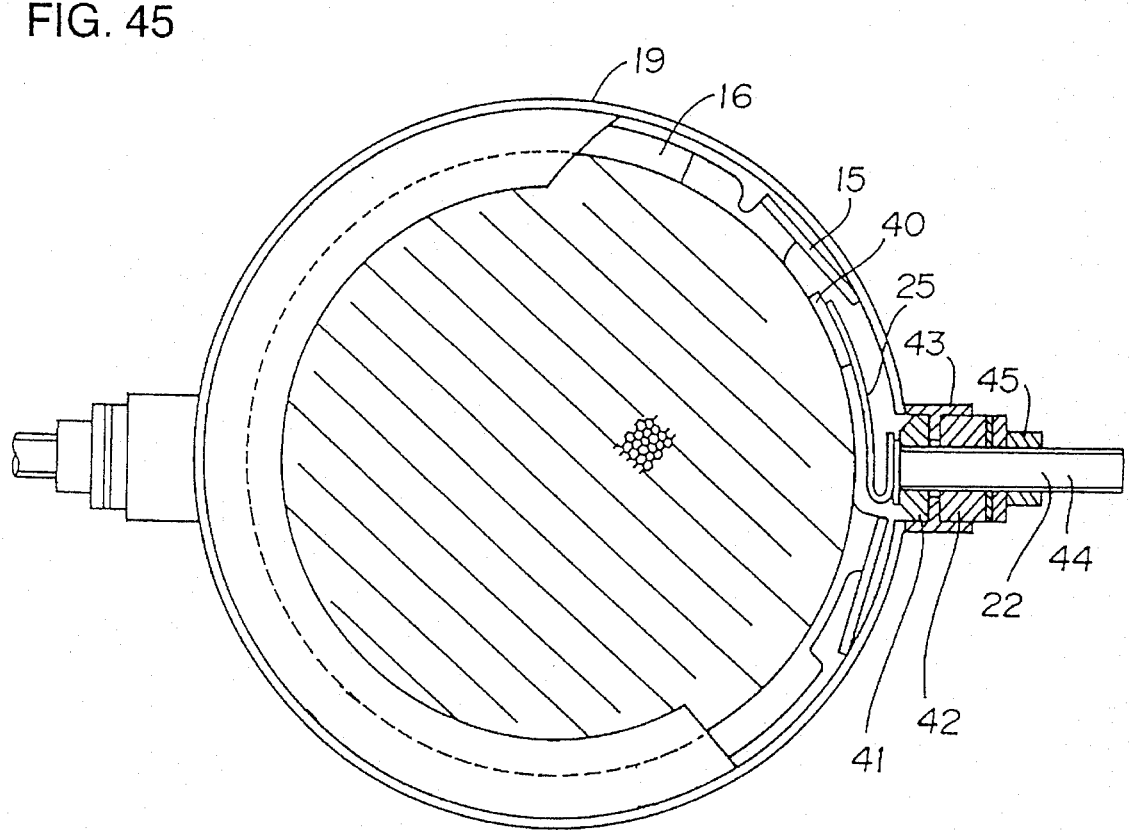
FIG. 45 is a plan view showing an example of the heater unit of the present invention, having the electrode structure of the second aspect.

Next, as shown in FIG. 45, one end of an electrically-conductive plate (connecting member) 25 made of SUS 409L and having a thickness of 1.0 mm, a width of 18 mm and a length of 45 mm, which was bent at an R of 46 mm in the length direction, was welded to a screw type electrode 22 made of SUS 409L and having an outside diameter of 6 mm, a pitch of 1 mm and a length of 35 mm. The other end of the electrically-conductive plate 25 was welded to the plate 40 of the honeycomb structure 10.

The fixation between each electrode and a casing was conducted as shown in FIG. 45. That is, a lower insulator 41 (inside diameter: 6.5 mm, outside diameter: 14.5 mm, thickness: 4.5 mm) and an upper insulator 42 (inside and outside diameters: same as above, thickness: 7.0 mm) were fitted inside a fixing ring 43 (inside diameter: 15.0 mm, outside diameter: 18.0 mm); an electrode 22 was inserted into the lower insulator 41 and the upper insulator 42; a nut 45 was fitted to the projecting screw portion 44 of the electrode 22; thereby, the insulators 41 and 42, the fixing ring 43 and the electrode 22 were fixed temporarily.

Figure 46:
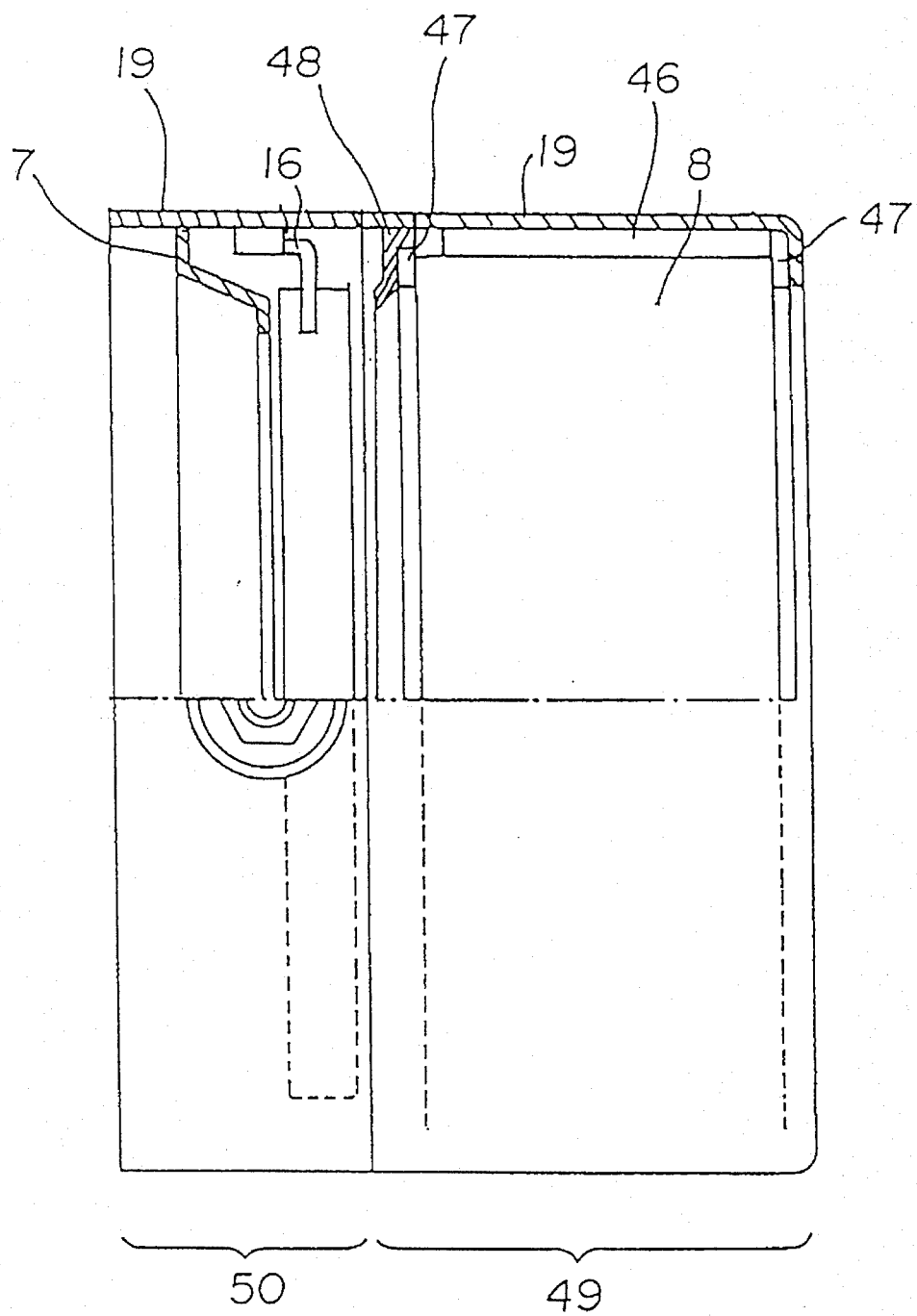
FIG. 46 is a partially cutaway side view of the heater unit of FIG. 45.

The thus-obtained heater unit fitted with the electrodes and supporting members were placed in a casing 19 (made of SUS 310S and having a thickness of 1.5 mm), and the fixing ring 43 of each electrode 22 and each leg 15 of each supporting member 16 were fixed to the casing 19 by welding, as shown in FIGS. 45 and 46. Then, a windshield ring 7 (made of SUS 310S and having a thickness of 1.5 mm) was fixed to the casing 19 by welding so that the gap between the honey-comb structure 10 and the windshield ring 7 became a distance shown in Table 1.

Then, a light-off catalyst 8 was prepared by loading a catalyst in the same manner as in the case of the heater unit, on a cordierite honeycomb structure of 95 mm in outside diameter and 56 mm in length comprising teragonal cells each having a rib thickness of 0.15 mm, at a cell density of 400 cells/in.$^2$. Round this light-off catalyst 8 was wound a mat 46 of 4.9 mm in thickness {INTERAM manufactured by 3M}. A stainless steel wire mesh 47 of 90 mm in inside diameter, 100 mm in outside diameter and 2 mm in thickness was provided at the two ends of the light-off catalyst 8. The resulting material was forced into a casing 19 made of SUS 310S and having a dimension of 105 mm in outside diameter, 51.5 mm in lendth and 1.5 mm in thickness and was pressurized from the inlet side end with a retainer ring 48, and the retainer ring 48 was welded to the casing 19 to fix the light-off catalyst 8 to the casing 19.

The thus-obtained light-off catalyst unit 49 was fixed to the heater unit 50 so that the gap between the honeycomb heater outlet end of the heater unit 50 and the retainer ring 48 of the light-off catalyst unit 49 became a given distance. Then, the nut 45 and the upper insulator 42 were removed; an inorganic mat (Bond X #96 manufactured by Nihon Kagaku Kogyo) was filled; the upper insulator 42 was inserted; tightening was conducted with the nut 45; and drying was conducted in air at 100° C. for 1 hour and then at 300° C. for 1 hour for fixation. Thus, there was obtained a heater unit with a light-off catalyst, having a length of 93 mm, as shown in FIG. 46.

EXAMPLES 4–6 and COMPARATIVE EXAMPLES 1–2

The same heater unit having electrodes and supporting members, as used in Example 1 was obtaiend in the same manner as in Examples 1–3. The heater unit was fixed, by welding in the same manner as in Examples 1–3, to a casing 3 as shown in FIG. 1, made of SUS 310S and having an outside diameter of 105 mm and a thickness of 1.5 mm (the casing 3 had a constricted inlet portion of 79 mm in inside diameter) so that the gap between the outer periphery of the inlet end 2 of the honeycomb heater 1 of the heater unit and the portion of the casing 3 closest to said outer periphery became a distance shown in FIG. 1, whereby a heater unit 50 was obtained.

Separately, there was prepared a light-off catalyst 8 which was the same as used in Example 1 except that it had an outside diameter of 91.5 mm and a length of 53 mm. Round the light-off catalyst 8 was wound the same mat (INTERAM) as used in Examples 1–3, and the light-off catalyst 8 was inserted into a casing 3 made of SUS 310S and having a dimension of 102 mm in outside diameter, 51 mm in length and 1.5 mm in thickness. A sealing rope for gas sealing, made of a stainless steel wire and a mat (INTERAM), was provided at the outer periphery of the inlet of the light-off catalyst 8, whereby a light-off catalyst unit 49 was obtained. The casing 3 of the heater unit 50 was welded to the casing 3 of the light-off catalyst unit 49 so that the gap between the outlet end 51 of the honeycomb heater 1 of the heater unit 50 and the inlet end 52 of the light-off catalyst 8 became 4 mm, whereby a heater unit with a light-off catalyst, having a length of 93 mm was obtained as shown in FIG. 1.

(Test)

Each of the above-obtained heater units each with a light-off catalyst was subjected to a 100-hour accelerated durability test by repeating a cycle in which the heater unit was exposed to an exahust gas having a temperature of 750° C. at the inlet of the unit, for 60minutes and then no fuel was fed for 5 seconds. The resulting heater unit with a light-off catalyst was mounted on a vehicle having a 2.0-liter engine of in-line four cylinders, at a position distant by 750 mm from the engine exhaust port. Downstream of the light-off catalyst was provided a 1.7-liter main catalyst also subjected to the same 100-hour accelerated durability test. At a position by 150 mm upstream of the hoenycomb heater of the heater unit was provided an inlet for secondary air, and secondary air was introduced therethrough. Using a constant-voltage generator, electrification (2 KW) was applied to the honeycomb heater during the cold start (for 30 seconds after engine cranking) of FTP. The results of Bag 1A (0 to 140 seconds) are shown in Table 1.

Separately, each heater unit with no light-off catalyst was measured for the amount of the exhaust gas flowing outside the honeycomb heater, by feeding air into the heater using a blower. The results are also shown in Table 1.

TABLE 1

|  | Distance between honeycomb heater and casing or windshield ring | Amount of exhaust gas flowing outside heater | Bag 1A HC emission (g) |
| --- | --- | --- | --- |
| Example 1 FIG. 46 | 1 mm | 10% | 0.56 |
| Example 2 FIG. 46 | 2 mm | 15% | 0.58 |
| Example 3 FIG. 46 | 3 mm | 20% | 0.59 |
| Example 4 FIG. 1 | 1 mm | 11% | 0.54 |
| Example 5 FIG. 1 | 2 mm | 16% | 0.57 |
| Example 6 FIG. 1 | 3 mm | 20% | 0.58 |
| Comparative Example 1 FIG. 46 | No windshield ring used. | 36% | 0.72 |
| Comparative Example 2 FIG. 1 | 4 mm | 35% | 0.69 |

As is clear from Table 1, the emission amount is smaller when the distance between the casing or windshield ring and the surface of honeycomb heater is 3 mm or less and thereby the amount of exhaust gas flowing outside honeycomb heater is controlled at 20% or less of the total flow amount of exhaust gas.

As stated above, the present invention can provide heater units and catalytic converters, which when exposed to severe driving conditions of automobiles, etc. and subjected to vibration and the expansion and contraction caused by thermal shock, gives rise to neither breakage of honeycomb heater nor peeling and can maintain the purification ability for exhaust gases of automobiles, etc.

What is claimed is:

1. A heater unit, comprising:

a honeycomb heater comprising (i) a metallic honeycomb structure having an inlet, an outlet, an outer peripheral wall and a plurality of parallel passages extending along an axial direction, and (ii) at least one electrode attached to the honeycomb structure for electrification of the honeycomb structure;

a metallic casing for holding the honeycomb heater; and a gas flow-controlling means for controlling flow of exhaust gas through the heater unit, such that about 2 to 20% of the exhaust gas flows outside the honeycomb heater, between the honeycomb heater and the metallic casing.

2. A heater unit, comprising:

a honeycomb heater comprising (i) a metallic honeycomb structure having an inlet, an outlet, an outer peripheral wall and a plurality of parallel passages extending along an axial direction, and (ii) at least one electrode attached to the honeycomb structure for electrification of the honeycomb structure;

a metallic casing for holding the honeycomb heater;

supporting means for supporting the honeycomb heater in the casing, absorbing displacement of the honeycomb heater with respect to the casing in a direction substantially perpendicular to the axial direction, and preventing displacement of the honeycomb heater with respect to the casing along the axial direction, said supporting means comprising at least one metallic supporting member connecting the honeycomb heater to the casing;

an insulation portion provided at least between the honeycomb heater and the supporting member or between the supporting member and the casings; and a gas flow-controlling means for controlling flow of exhaust gas through the heater unit, such that about 2 to 20% of the exhaust gas flows outside the honeycomb heater.

3. The heater unit of claim 2, wherein the honeycomb heater is positioned with respect to the casing to form a gap therebetween which is not greater than 3 mm.

4. The heater unit of claim 3, wherein said gap is provided between the inlet of the honeycomb heater and the casing.

5. The heater unit of claim 3, wherein the gap is provided between the outer peripheral wall of the honeycomb heater and the casing.

6. The heater unit according to claim 2, wherein said gas flow-controlling means comprises a shielding member attached to the casing, the honeycomb heater being positioned within the casing such that a distance between the shielding member and the honeycomb heater is not greater than 3 mm.

7. The heater unit according to claim 6, wherein the shielding member is positioned along at least one position from the group consisting of the inlet of the honeycomb heater, the outlet of the honeycomb heater, and outer peripheral wall of the honeycomb heater.

8. A heater unit, comprising:

a honeycomb heater comprising (i) a metallic honeycomb structure having an inlet, an outlet, an outer peripheral wall and a plurality of parallel passages extending along an axial direction, and (ii) at least one electrode attached to the honeycomb structure for electrification of the honeycomb structure;

a metallic casing for holding the honeycomb heater;

connecting means for connecting the electrode to the honeycomb structure and absorbing displacement of the honeycomb heater with respect to the casing in a direction substantially perpendicular to the axial direction, said connecting means comprising a metallic connecting member; and a gas flow-controlling means for controlling flow of exhaust gas through the heater unit, such that about 2 to 20% of the exhaust gas flows outside the honeycomb heater.

9. The heater unit of claim 8, wherein the honeycomb heater is positioned with respect to the casing to form a gap therebetween which is not greater than 3 mm.

10. The heater unit of claim 9, wherein said gap is provided between the inlet of the honeycomb heater and the casing.

11. The heater unit of claim 9, wherein the gap is provided between the outer peripheral wall of the honeycomb heater and the casing.

12. The heater unit according to claim 8, wherein said gas flow-controlling means comprises a shielding member attached to the casing, the honeycomb heater being positioned within the casing such that a distance between the shielding member and the honeycomb heater is not greater than 3 mm.

13. The heater unit according to claim 12, wherein the shielding member is positioned along at least one position from the group consisting of the inlet of the honeycomb heater, the outlet of the honeycomb heater, and outer peripheral wall of the honeycomb heater.

14. A heater unit, comprising:

a honeycomb heater comprising (i) a metallic honeycomb structure having an inlet, an outlet, an outer peripheral wall and a plurality of parallel passages extending along an axial direction, (ii) at least one electrode attached directly to the honeycomb structure for electrification of the honeycomb structure, and (iii) an insulating member secured to the at least one electrode;

a metallic casing for holding the honeycomb heater;

buffer means for securing the electrode to the casing and absorbing displacement of the honeycomb heater with respect to the casing in a direction substantially perpendicular to the axial direction, said buffer means comprising a buffer member provided between the insulating member and the casing; and a gas flow-controlling means for controlling flow of exhaust gas through the heater unit, such that about 2 to 20% of the exhaust gas flows outside the honeycomb heater.

15. The heater unit of claim 14, wherein the honeycomb heater is positioned with respect to the casing to form a gap therebetween which is not greater than 3 mm.

16. The heater unit of claim 15, wherein said gap is provided between the inlet of the honeycomb heater and the casing.

17. The heater unit of claim 15, wherein the gap is provided between the outer peripheral wall of the honeycomb heater and the casing.

18. The heater unit according to claim 14, wherein said gas flow-controlling means comprises a shielding member attached to the casing, the honeycomb heater being positioned within the casing such that a distance between the shielding member and the honeycomb heater is not greater than 3 mm.

19. The heater unit according to claim 18, wherein the shielding member is positioned along at least one position from the group consisting of the inlet of the honeycomb heater, the outlet of the honeycomb heater, and outer peripheral wall of the honeycomb heater.

20. A catalytic converter, comprising:

a honeycomb heater comprising (i) a metallic honeycomb structure having an inlet, an outlet, an outer peripheral wall and a plurality of parallel passages extending along an axial direction, and (ii) at least one electrode attached to the honeycomb structure for electrification of the honeycomb structure;

a metallic casing for holding the honeycomb heater;

a light-off catalyst comprising a honeycomb structure having a plurality of parallel passages extending along the axial direction thereof, said light-off catalyst being provided in the metallic casing and downstream of the honeycomb heater;

supporting means for supporting the honeycomb heater in the casing, absorbing displacement of the honeycomb heater with respect to the casing in a direction substantially perpendicular to the axial direction, and preventing displacement of the honeycomb heater with respect to the casing along the axial direction, said supporting means comprising at least one metallic supporting member connecting the honeycomb heater to the casing;

an insulation portion provided at least between the honeycomb heater and the supporting member or between the supporting member and the casing; and a gas flow-controlling means for controlling flow of exhaust gas through the heater unit, such that about 2 to 20% of the exhaust gas flows outside the honeycomb heater.

21. A catalytic converter, comprising:

a honeycomb heater comprising (i) a metallic honeycomb structure having an inlet, an outlet, an outer peripheral wall and a plurality of parallel passages extending along an axial direction, and (ii) at least one electrode attached to the honeycomb structure for electrification of the honeycomb structure;

a metallic casing for holding the honeycomb heater;

a light-off catalyst comprising a honeycomb structure having a plurality of parallel passages extending along the axial direction thereof, said light-off catalyst being provided in the metallic casing and downstream of the honeycomb heater;

connecting means for connecting the electrode to the honeycomb structure and absorbing displacement of the honeycomb heater with respect to the casing in a direction substantially perpendicular to the axial direction, said connecting means comprising a metallic connecting member; and a gas flow-controlling means for controlling flow of exhaust gas through the heater unit, such that about 2 to 20% of the exhaust gas flows outside the honeycomb heater.

22. A catalytic converter, comprising:

a honeycomb heater comprising (i) a metallic honeycomb structure having an inlet, an outlet, an outer peripheral wall and a plurality of parallel passages extending along an axial direction, (ii) at least one electrode attached directly to the honeycomb structure for electrification of the honeycomb structure, and (iii) an insulating member secured to the at least one electrode;

a metallic casing for holding the honeycomb heater;

a light-off catalyst comprising a honeycomb structure having a plurality of parallel passages extending along the axial direction thereof, said light-off catalyst being provided in the metallic casing and downstream of the honeycomb heater;

buffer means for securing the electrode to the casing and absorbing displacement of the honeycomb heater with respect to the casing in a direction substantially perpendicular to the axial direction, said buffer means comprising a buffer member provided between the insulating member and the casing; and a gas flow-controlling means for controlling flow of exhaust gas through the heater unit, such that about 2 to 20% of the exhaust gas flows outside the honeycomb heater.

* * * * *